(12) United States Patent
Huang et al.

(10) Patent No.: US 12,439,464 B2
(45) Date of Patent: Oct. 7, 2025

(54) MULTI-LINK OPERATION (MLO) FOR EASY MESH

(71) Applicant: QUALCOMM Incorporated, San Diego, CA (US)

(72) Inventors: Xiaolong Huang, Santee, CA (US); Sai Yiu Duncan Ho, San Diego, CA (US); Srinivas Katar, Fremont, CA (US); Mughilan Ramajayam, Pleasanton, CA (US); Sandip Homchaudhuri, San Jose, CA (US); Manish Shukla, Milpitas, CA (US)

(73) Assignee: QUALCOMM Incorporated, San Diego, CA (US)

( * ) Notice: Subject to any disclaimer, the term of this patent is extended or adjusted under 35 U.S.C. 154(b) by 510 days.

(21) Appl. No.: 17/946,855

(22) Filed: Sep. 16, 2022

(65) Prior Publication Data

US 2024/0098811 A1 Mar. 21, 2024

(51) Int. Cl.
*H04W 4/00* (2018.01)
*H04W 48/16* (2009.01)
(Continued)

(52) U.S. Cl.
CPC ............ *H04W 76/11* (2018.02); *H04W 48/16* (2013.01); *H04W 88/10* (2013.01)

(58) Field of Classification Search
CPC .............................. H04W 76/11; H04W 48/16
(Continued)

(56) References Cited

U.S. PATENT DOCUMENTS 11,432,138 B1 * 8/2022 Jiang ..................... H04L 63/062
2022/0167256 A1 * 5/2022 Kneckt ................ H04W 12/02
(Continued)

FOREIGN PATENT DOCUMENTS

EP          3989452 A1    4/2022
WO   WO-2021161225 A1    8/2021

OTHER PUBLICATIONS

Fang Y. (ZTE TX), et al., "Unified Multi-link and Multi-AP Reference Model Discussion", IEEE 802.11-2020/0068, IEEE-SA Mentor, Piscataway, NJ, USA, vol. 802.11 EHT, 802.11be, Jan. 11, 2020, pp. 1-14, XP068165083.

(Continued)

*Primary Examiner* — Temica M Beamer
(74) *Attorney, Agent, or Firm* — Holland & Hart LLP/Qualcomm

(57) ABSTRACT

A first Multi-AP device configured as a Multi-AP Agent transmits, to a second Multi-AP device configured as a Multi-AP Controller over a first communication link, a Device Provisioning Protocol (DPP) Configuration Request Message indicating multi-link operation (MLO) capabilities of the first Multi-AP device. The first Multi-AP device receives, from the second Multi-AP device over the first communication link, a DPP Configuration Response Message indicating MLO association information responsive to the indicated MLO capabilities, and establishes a backhaul path with a third Multi-AP device, configured as a second Multi-AP Agent, on the first communication link and one or more second communication links according to the MLO association information. The MLO capabilities may be indicated in a DPP Configuration Object of the DPP Configuration Request Message, and the MLO association information may be indicated in a multi-link device (MLD) address (Continued)

field of a DPP Configuration Object of the DPP Configuration Response Message.

30 Claims, 16 Drawing Sheets

(51) Int. Cl.
*H04W 76/11* (2018.01)
*H04W 88/10* (2009.01)

(58) Field of Classification Search
USPC .......................................................... 370/328
See application file for complete search history.

(56) References Cited

U.S. PATENT DOCUMENTS

| | | | |
|---|---|---|---|
| 2022/0256327 A1 | 8/2022 | Jang et al. | |
| 2022/0287122 A1* | 9/2022 | Wang | H04W 8/22 |
| 2024/0089891 A1* | 3/2024 | Kneckt | H04W 48/14 |

OTHER PUBLICATIONS

International Search Report and Written Opinion—PCT/US2023/071531—ISA/EPO—Nov. 29, 2023.
WiFi Alliance: "Multi-AP Specification Version 2.0 Wi-Fi Alliance Proprietary—Subject to Change Without Notice", Dec. 18, 2019, pp. 1-113, XP055801379, pp. 17-35,63.

* cited by examiner

1800A

| Field / Name | Length | Value | Description |
|---|---|---|---|
| tlvType | 1 octet | 0xB7 | MLD Configuration Report TLV. |
| tlvLength | 2 octets | Variable | Number of octets in ensuing field. |
| tlvValue | | | |
| | 1 octet | k | Number of MLDs reported. |
| | 6 octets | Variable | MLD MAC Address |
| | 1 octet | m | Number of BSSs under the MLD |
| | 6 octets | Variable | MAC Address of the BSS |
| | The above 1 fields are repeated m – 1 times (if m = 0, these fields are omitted). | | |
| | The above 3 fields are repeated k – 1 times. | | |

| Field | Length | Value | Description |
|---|---|---|---|
| tlvType | 1 octet | 0x?? | MLO Support TLV. |
| tlvLength | 2 octets | Variable | Number of octets in ensuing field. |
| tlvValue | 6 octets | Variable | MLD MAC Address |
| | 2 octets | Variable | 11be EML Capabilities subfield data |
| | 2 octets | Variable | 11be MLD Capabilities subfield data |
| | 1 octet | l | Number of Links |
| | 1 octet | Variable | Link ID if the TLV is in AP Capability Report |
| | 6 octets | Variable | MAC Address of the link |
| | 1 octet | Variable | Operating Class |
| | 1 octet | Variable | Channel Number |
| | The above 4 fields are repeated l-1 times. | | |

| Field | Length | Value | Description |
|---|---|---|---|
| tlvType | 1 octet | 0x?? | Associated Non-AP MLD Operation TLV. |
| tlvLength | 2 octets | Variable | Number of octets in ensuing field. |
| tlvValue | 6 octets | Variable | AP MLD MAC Address |
| | 6 octets | Variable | Associated Non-AP MLD MAC Address |
| | 1 octet | l | Number of Links |
| | 1 octet | Variable | Link ID |
| | 6 octets | Variable | MAC Address of the associated Non-AP STA of the Link |
| | 1 octet | Variable | Operating Class |
| | 1 octet | Variable | Channel Number |
| | 1 octet | Variable | Presence bitmap<br>Bit 0: presence of Bitmap of TIDs field |
| | 1 octet | Variable | Bitmap of TIDs |
| | 1 octet | m | Number of TID |
| | 1 octet | Variable | (Internal, not for standard submission)<br>Link residency percentage of the nth TID of this STA within the TIDs identified in the Bitmap of TIDs field.<br><br>Note: this field identifies the STA's percentage of use of this link among all the links it uses within its MLO association for this TID. |
| | 1 octet | Variable | (Internal, not for standard submission)<br>Link residency jitter<br><br>Note: this field identifies the standard deviation of STA's percentage of use of this link among all the links it uses within its MLO association for this TID. |
| | The above 2 fields are repeated m-1 times. | | |
| | 4 octets | Variable | Reserved |
| | The above 10 fields are repeated l-1 times. | | |

| Field | Length | Value | Description |
|---|---|---|---|
| tlvType | 1 octet | 0x9E | Backhaul Non-AP MLD Steering Request TLV. |
| tlvLength | 2 octets | 14 | Number of octets in ensuing field. |
| tlvValue | 6 octets | Any EUI-48 value | MAC address of the associated backhaul non-AP MLD operated by the Multi-AP Agent. |
| | 6 octets | Any EUI-48 value | MAC address of the AP MLD for association. |
| | 6 octets | Any EUI-48 value | MAC address of the AP affiliated with AP MLD for association. |
| | 1 octet | l | Number of Links |
| | 1 octet | Variable | Link ID |
| | 6 octets | Variable | MAC Address of the AP of the Link |
| | 1 octet | Variable | Operating Class |
| | 1 octet | Variable | Channel Number |
| | 1 octet | Variable | Presence bitmap<br>Bit 0: presence of Bitmap of TIDs field |
| | 1 octet | Variable | Bitmap of TIDs |
| | 4 octets | Variable | Reserved |
| | The above 7 fields are repeated l-1 times. | | |

| Field | Length | Value | Description |
|---|---|---|---|
| tlvType | 1 octet | 0x9E | AP MLD TID-To-Link Mapping Request TLV. |
| tlvLength | 2 octets | 14 | Number of octets in ensuing field. |
| tlvValue | 6 octets | Any EUI-48 value | AP MLD MAC Address (pertinent to 1905.1 AL MAC Address) |
| | 6 octets | Any EUI-48 value | Non-AP MLD MAC Address |
| | 1 octet | l | Number of Links |
| | 1 octet | Variable | Link ID |
| | 1 octet | Variable | Bitmap of TIDs |
| | The above 2 fields are repeated l-1 times. | | |

*Figure 18E*

MULTI-LINK OPERATION (MLO) FOR EASY MESH

TECHNICAL FIELD

This disclosure relates generally to wireless communications including enabling multi-link operation (MLO) on multi-access point (AP) networks.

DESCRIPTION OF THE RELATED TECHNOLOGY

Wireless communications systems are widely deployed to provide various types of communication content such as voice, video, packet data, messaging, broadcast, and so on. A wireless local area network (WLAN) may be formed by one or more access points (APs) that provide a shared wireless communication medium for use by client devices such as stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP.

Mesh networks may be used in various environments including home entertainment systems, home automation, factory automation, and so on. In a mesh network, wireless devices operating as mesh nodes may be connected to one another in a non-hierarchical network topology via mesh links, and may cooperate with one another to propagate data and other information from a source to a destination over one or more mesh links established during a path discovery procedure.

A mesh network that includes Multi-AP devices may be referred to as a Multi-AP network. Each of the Multi-AP devices that form a Multi-AP network may include a Multi-AP Controller, a Multi-AP Agent, or both. The Multi-AP Controller implements logic that controls the fronthaul APs and the backhaul links associated with the Multi-AP network. The Multi-AP Controller also implements functions to onboard and provision Multi-AP devices onto the Multi-AP network. The Multi-AP Agent implements logic that executes commands received from the Multi-AP Controller, reports measurements and device capabilities to the Multi-AP Controller, and interfaces with Wi-Fi sub-systems for fronthaul APs and backhaul STAs associated with the Multi-AP devices.

SUMMARY

The systems, methods and devices of this disclosure each have several innovative aspects, no single one of which is solely responsible for the desirable attributes disclosed herein.

One innovative aspect of the subject matter described in this disclosure can be implemented in a first Multiple Access Point (Multi-AP) device. The first Multi-AP device may include a processing system and one or more interfaces coupled to the processing system. The one or more interfaces may be configured to output a Device Provisioning Protocol (DPP) Configuration Request Message to a second Multi-AP device over a first communication link, the DPP Configuration Request Message indicating multi-link operation (MLO) capabilities of the first Multi-AP device. The one or more interfaces may be configured to obtain a DPP Configuration Response Message from the second Multi-AP device over the first communication link, the DPP Configuration Response Message indicating MLO association information responsive to the indicated MLO capabilities. The processing system may be configured to establish a backhaul path with a third Multi-AP device on the first communication link and one or more second communication links according to the MLO association information. In some instances, the MLO capabilities of the first Multi-AP device may be indicated in a DPP Configuration Object of the DPP Configuration Request Message. In some other instances, the MLO association information may be indicated in a multi-link device (MLD) address field of a DPP Configuration Object of the DPP Configuration Response Message.

In some aspects, the first Multi-AP device may be a first Multi-AP Agent including a backhaul station (STA) MLD configured to communicate with the third Multi-AP device over one or more of the first or second communication links. The second Multi-AP device may be a Multi-AP Controller configured to onboard the first and third Multi-AP devices according to a Multi-AP communication protocol. The third Multi-AP device may be a second Multi-AP Agent including a fronthaul AP MLD configured to communicate with the backhaul STA MLD of the first Multi-AP Agent over the one or more of the first or second communication links.

In some aspects, the one or more interfaces also may be configured to output a Basic Service Set (BSS) Configuration Request message to the second Multi-AP device over the first communication link, the BSS Configuration Request Message indicating MLO capabilities of the BSS associated with the first Multi-AP device. The one or more interfaces also may be configured to obtain a BSS Configuration Response Message from the second Multi-AP device over the first communication link, the BSS Configuration Response Message indicating one or more BSSs associated with a common MLD identifier (ID). In some instances, the MLO capabilities of the BSS associated with the first Multi-AP device may be indicated in a DPP Configuration Object of the BSS Configuration Request Message. In some other instances, the one or more BSSs associated with the common MLD ID may be indicated in an MLD address field of a DPP Configuration Object of the BSS Configuration Response Message.

In some aspects, the one or more interfaces also may be configured to obtain an AP Capability Query message from the Multi-AP Controller, and to output an AP Capability Report message to the Multi-AP Controller, the AP Capability Report message including an MLO Support Type-Length-Value (TLV) indicating MLO capabilities of the fronthaul AP MLD of the second Multi-AP Agent. In some other implementations, the one or more interfaces also may be configured to obtain an AP Capability Query message from the Multi-AP Controller, and to output a Backhaul STA Capability Report message to the Multi-AP Controller, the Backhaul STA Capability Report message including an MLO Support TLV indicating MLO capabilities of the backhaul STA MLD of the first Multi-AP Agent.

In some aspects, the one or more interfaces also may be configured to obtain an AP Metrics Query message from the Multi-AP Controller, and to output an AP Metrics Response message to the Multi-AP Controller, the AP Metrics Response message including an Associated Non-AP Operation TLV for each STA of the backhaul STA MLD of the first Multi-AP Agent. In some aspects, the Associated Non-AP Operation TLV for a respective STA of the backhaul STA MLD may indicate an MLO configuration between the respective STA and a respective AP of a fronthaul AP MLD of the first Multi-AP Agent. In some other aspects, the Associated Non-AP Operation TLVs for the backhaul STA MLD may indicate Traffic Identifier (TID)-to-Link Mappings associated with the backhaul STA MLD of the first Multi-AP Agent and the fronthaul AP MLD of the first Multi-AP Agent.

Another innovative aspect of the subject matter described in this disclosure can be implemented as a method for wireless communication by a first Multi-AP device. In some implementations, the method includes transmitting a DPP Configuration Request Message to a second Multi-AP device over a first communication link, the DPP Configuration Request Message indicating MLO capabilities of the first Multi-AP device. The method includes receiving a DPP Configuration Response Message from the second Multi-AP device over the first communication link, the DPP Configuration Response Message indicating MLO association information responsive to the indicated MLO capabilities. The method includes establishing a backhaul path with a third Multi-AP device on the first communication link and one or more second communication links according to the MLO association information. In some instances, the MLO capabilities of the first Multi-AP device may be indicated in a DPP Configuration Object of the DPP Configuration Request Message. In some other instances, the MLO association information may be indicated in an MLD address field of a DPP Configuration Object of the DPP Configuration Response Message.

In some aspects, the first Multi-AP device may be a first Multi-AP Agent including a backhaul STA MLD configured to communicate with the third Multi-AP device over one or more of the first or second communication links. The second Multi-AP device may be a Multi-AP Controller configured to onboard the first and third Multi-AP devices according to a Multi-AP communication protocol. The third Multi-AP device may be a second Multi-AP Agent including a fronthaul AP MLD configured to communicate with the backhaul STA MLD of the first Multi-AP Agent over the one or more of the first or second communication links.

In some aspects, the method also may include transmitting a BSS Configuration Request message to the second Multi-AP device over the first communication link, the BSS Configuration Request Message indicating MLO capabilities of the BSS associated with the first Multi-AP device. The method also may include receiving a BSS Configuration Response Message from the second Multi-AP device over the first communication link, the BSS Configuration Response Message indicating one or more BSSs associated with a common MLD ID. In some instances, the MLO capabilities of the BSS associated with the first Multi-AP device may be indicated in a DPP Configuration Object of the BSS Configuration Request Message. In some other instances, the one or more BSSs associated with the common MLD ID may be indicated in an MLD address field of a DPP Configuration Object of the BSS Configuration Response Message.

In some aspects, the method also may include receiving an AP Capability Query message from the Multi-AP Controller, and transmitting an AP Capability Report message to the Multi-AP Controller, the AP Capability Report message including an MLO Support TLV indicating MLO capabilities of the fronthaul AP MLD of the second Multi-AP Agent. In some other implementations, the method also may include receiving an AP Capability Query message from the Multi-AP Controller, and transmitting a Backhaul STA Capability Report message to the Multi-AP Controller, the Backhaul STA Capability Report message including an MLO Support TLV indicating MLO capabilities of the backhaul STA MLD of the first Multi-AP Agent.

In some aspects, the method also may include receiving an AP Metrics Query message from the Multi-AP Controller, and transmitting an AP Metrics Response message to the Multi-AP Controller, the AP Metrics Response message including an Associated Non-AP Operation TLV for each STA of the backhaul STA MLD of the first Multi-AP Agent. In some aspects, the Associated Non-AP Operation TLV for a respective STA of the backhaul STA MLD may indicate an MLO configuration between the respective STA and a respective AP of a fronthaul AP MLD of the first Multi-AP Agent. In some other aspects, the Associated Non-AP Operation TLVs for the backhaul STA MLD may indicate TID-to-Link Mappings associated with the backhaul STA MLD of the first Multi-AP Agent and a fronthaul AP MLD of the first Multi-AP Agent.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

FIG. 18A shows an example MLD Configuration Report Type-Length-Value (TLV) suitable for use in a Basic Service Set (BSS) Configuration Result message.

FIG. 18B shows an example MLO Support TLV suitable for use in an AP Capability Report message, a Backhaul STA Capability Report message, or a Client Capability Report message.

FIG. 18C shows an example Associated-Non-AP MLD Operation TLV suitable for use in an AP Metrics Response message or an Associated STA Link Metrics Response message.

FIG. 18D shows an example Backhaul Multi-link Steering Request TLV suitable for use in a Backhaul Steering Request message.

FIG. 18E shows an example AP MLD Traffic Identifier (TID)-To-Link Mapping Request TLV suitable for use in a Multi-AP Policy Configuration Request message.

Like reference numbers and designations in the various drawings indicate like elements.

DETAILED DESCRIPTION

Figure 1:
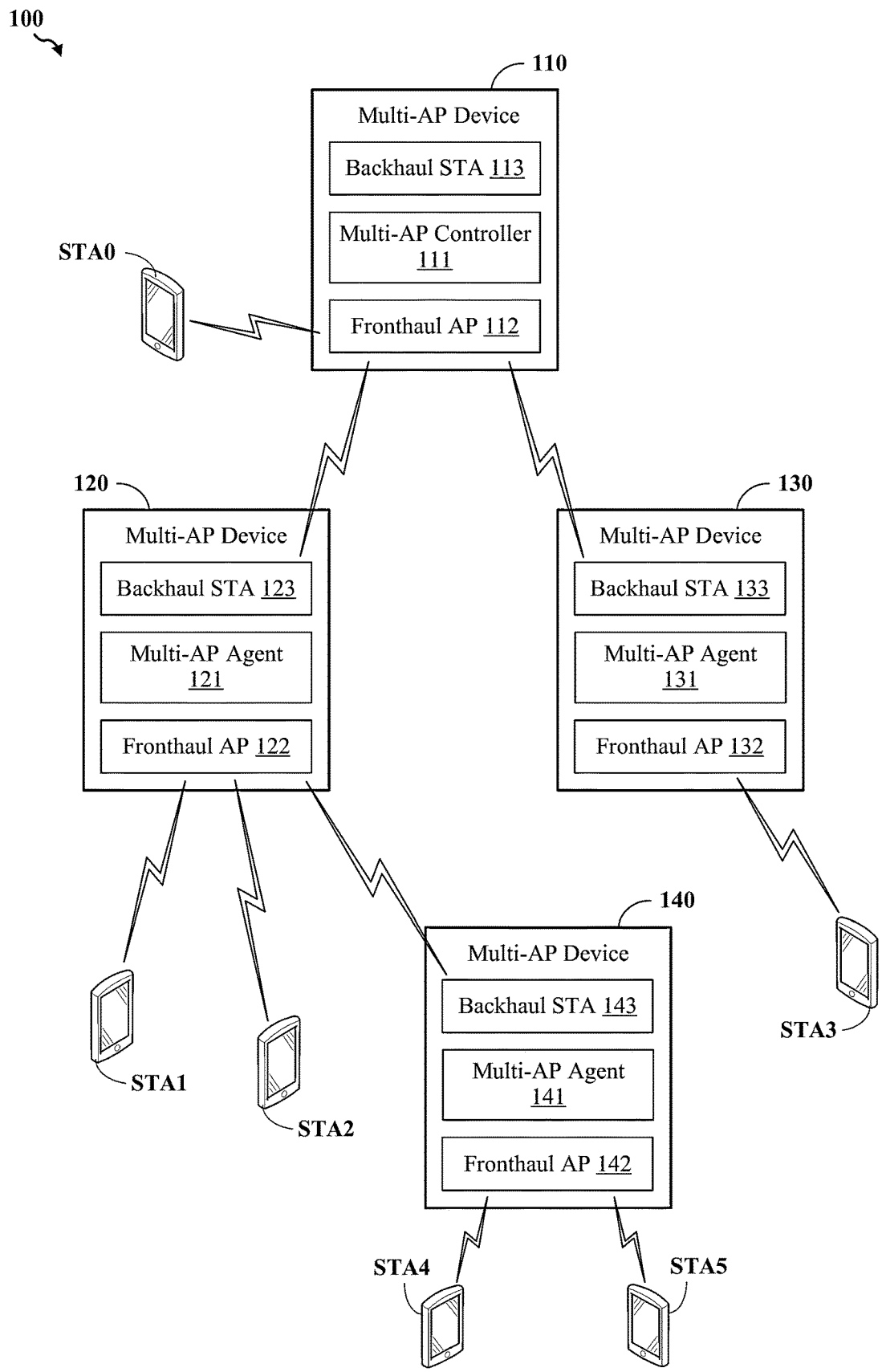
FIG. 1 shows an example Multi-AP network.

The following description is directed to some particular implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Long Term Evolution (LTE), 3G, 4G or 5G (New Radio (NR)) standards promulgated by the 3rd Generation Partnership Project (3GPP), the Institute of Electrical and Electronics Engineers (IEEE) 802.11 standards, the IEEE 802.15 standards, or the Bluetooth® standards as defined by the Bluetooth Special Interest Group (SIG), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless wide area network (WWAN), a wireless personal area network (WPAN), a wireless local area network (WLAN), or an internet of things (IOT) network.

Various implementations relate generally to enabling multi-link operation (MLO) in a Multi-AP Network, and specifically, to establishing multiple communication links between Multi-AP devices configured to operate according to the Wi-Fi EasyMesh™ Specification provided by the Wi-Fi Alliance (WFA). In various implementations, each of the Multi-AP devices may include a fronthaul AP MLD and a backhaul STA MLD. The fronthaul AP MLD of a respective Multi-AP device may include a plurality of APs that establish corresponding BSSs on a plurality of communication links of the Multi-AP Network. Client devices, downstream Multi-AP devices, or other devices associated with the fronthaul AP MLD can communicate with the respective Multi-AP device over multiple communication links of the Multi-AP Network. The backhaul STA MLD of the respective Multi-AP device may include a plurality of STAs that can associate with corresponding BSSs established on the respective plurality of communication links by an upstream Multi-AP device.

In some implementations, one of the Multi-AP devices may be configured to operate as a Multi-AP Controller, and the other Multi-AP devices may be configured to operate as Multi-AP Agents. The Multi-AP Controller can onboard the Multi-AP Agents according to a Device Provisioning Protocol (DPP) or a Multi-AP communication protocol to join the Multi-AP Agents to the Multi-AP Network.

Aspects of the present disclosure recognize that employing AP MLDs and STA MLDs in Multi-AP devices to enable multi-link operation (MLO) in a Multi-AP Network may be associated with the exchange of MLO association information, capabilities, and configuration information between the Multi-AP devices. Specifically, although MLO is supported in infrastructure WLANs operating according to the IEEE 802.11be amendments to the IEEE 802.11 wireless standard, MLO is not currently supported in mesh networks configured according to the Wi-Fi EasyMesh™ Specification or the Multi-AP Specification provided by the Wi-Fi Alliance. Moreover, IEEE 1905.1 management frames and messages communicated over a Multi-AP Network may not be configured to carry MLO association information, MLO capabilities, or MLO configuration information.

In various implementations, at least sone of the IEEE 1905.1 frames or messages that carry data and other information in a Multi-AP Network can be modified to carry or indicate one or more of MLO association information, MLO capabilities, and MLO configuration information of a respective Multi-AP device, the fronthaul AP MLD of the respective Multi-AP device, or the backhaul STA MLD of the respective Multi-AP device, among other examples. For example, in some implementations, one or more first IEEE 1905.1 frames or messages may include one or both of a DPP Configuration object or an MLD address field of the DPP Configuration object that can carry MLO association information, MLO capabilities, and MLO configuration information. In some other implementations, one or more second IEEE 1905.1 frames or messages may include an MLO Support Type-Length-Value (TLV) indicating MLO capabilities of one or both of the fronthaul AP MLD or the backhaul STA MLD of a respective Multi-AP device. In some instances, one or more third IEEE 1905.1 frames or messages may include or indicate Traffic Identifier (TID)-to-Link Mappings associated with the fronthaul AP MLD and backhaul STA MLD of the respective Multi-AP device.

Particular implementations of the subject matter described in this disclosure can be implemented to realize one or more of the following potential advantages. By modifying IEEE 1905.1 management frames and messages exchanged between Multi-AP devices to carry MLO capabilities, MLO association information, and MLO configuration information of Multi-AP devices operating as Multi-AP Agents in a Multi-AP Network, aspects of the present disclosure may enable MLO between Multi-AP devices associated with the Multi-AP Network. Specifically, by employing an AP MLD and a STA MLD as the fronthaul AP and backhaul STA, respectively, of a Multi-AP device, aspects of the present disclosure may allow the Multi-AP devices to communicate with one another on multiple communication links, thereby increasing the effective bandwidth of a Multi-AP Network (such as compared to conventional single-link Multi-AP Networks). Increasing the effective bandwidth of the Multi-AP Network may reduce latencies and may increase throughput associated with the Multi-AP Network.

FIG. 1 shows a block diagram of an example Multi-AP Network 100. In some instances, the Multi-AP Network 100 may operate according to the Wi-Fi EasyMesh™ Specification published by the Wi-Fi Alliance. The Multi-AP network 100 is shown to include four Multi-AP devices 110, 120, 130, and 140 connected to one another in a tree topology over one or more hops within the Multi-AP network 100. The tree topology may ensure that a single backhaul path can be established between any pair of Multi-AP devices in the Multi-AP network 100. Although not shown for simplicity, a logical Multi-AP control interface may be defined between the Multi-AP devices 110, 120, 130, and 140 over which configuration and control functions for fronthaul APs and backhaul links are executed. A Multi- AP control interface may exist between the Multi-AP Controller and the Multi-AP Agents associated with the Multi-AP network 100.

In the example of FIG. 1, the first Multi-AP device 110 is configured to operate as a Multi-AP Controller, and is shown to include a Multi-AP Controller 111, a fronthaul AP 112, and a backhaul STA 113. The fronthaul AP 112 may facilitate communications between the Multi-AP Controller 111 and one or more downstream devices. In some instances, the fronthaul AP 112 may establish a first BSS over which one or more associated client devices (such as STA0) can access the Multi-AP network 100 over a wireless channel. In some aspects, the backhaul STA of a respective downstream Multi-AP device may associate with the fronthaul AP 112 of the first Multi-AP device 110 over the wireless channel based on the IEEE 802.11 wireless standards. In this way, the first Multi-AP device 110 and the respective downstream Multi-AP device may communicate with each other over the wireless channel of the first BSS. In the example of FIG. 1, the fronthaul AP 112 of the first Multi-AP device 110 may communicate with client device STA0, the second Multi-AP device 120, and the third Multi-AP device 130 over the wireless channel associated with the first BSS.

The Multi-AP Controller 111 may control various operations of the fronthaul AP 112 through which the first Multi-AP device 110 communicates with one or more downstream Multi-AP devices. The Multi-AP Controller 111 also may control various operations of the backhaul STA 113 and one or more associated backhaul links over which the first Multi-AP device 110 communicates with one or more upstream devices. In some instances, the Multi-AP Controller 111 may facilitate onboarding and provisioning procedures that join Multi-AP devices to the Multi-AP network 100.

The second Multi-AP device 120 is configured to operate as a Multi-AP Agent, and is shown to include a Multi-AP Agent 121, a fronthaul AP 122, and a backhaul STA 123. The fronthaul AP 122 may facilitate communications between the second Multi-AP device 120 and one or more downstream devices. In some instances, the fronthaul AP 112 may establish a second BSS over which one or more associated client devices (such as STA1 and STA2) can access the Multi-AP network 100 over the wireless channel. The backhaul STA of a respective downstream Multi-AP device may associate with the fronthaul AP 122 of the second Multi-AP device 120 over the wireless channel based on the IEEE 802.11 wireless standards, thereby allowing the second Multi-AP device 120 and the respective downstream Multi-AP device to communicate with each other over the wireless channel of the second BSS. In the example of FIG. 1, the fronthaul AP 122 of the second Multi-AP device 120 may communicate with client devices STA1-STA2 and the fourth Multi-AP device 140 over the wireless channel associated with the second BSS.

The backhaul STA 123 may facilitate communications between the second Multi-AP device 120 and one or more upstream devices (such as the first Multi-AP device 110) over the backhaul link of the Multi-AP network 100. The Multi-AP Agent 121 may execute commands received from the Multi-AP Controller 111, and may report measurements and capability information of the fronthaul AP 122, the client devices STA1-STA2, the backhaul STA 123, and the backhaul link to the Multi-AP Controller 111. The Multi-AP Controller 111 may use the reported measurements and capability information to provision or re-provision various wireless resources of the Multi-AP network 100 to the second Multi-AP device 120.

The third Multi-AP device 130 is configured to operate as a Multi-AP Agent, and is shown to include a Multi-AP Agent 131, a fronthaul AP 132, and a backhaul STA 133. The fronthaul AP 132 may facilitate communications between the third Multi-AP device 130 and one or more downstream devices. In some instances, the fronthaul AP 132 may establish a third BSS over which one or more associated client devices (such as STA3) can access the Multi-AP network 100 over the wireless channel. In some instances, the backhaul STAs of a respective downstream Multi-AP device (not shown for simplicity) may associate with the fronthaul AP 132 of the third Multi-AP device 130 over the wireless channel based on the IEEE 802.11 wireless standards, thereby allowing the third Multi-AP device 130 and the respective downstream Multi-AP device to communicate with each other over the wireless channel associated with the third BSS.

The backhaul STA 133 may facilitate communications between the third Multi-AP device 130 and one or more upstream devices (such as the Multi-AP Controller 111) over the backhaul link of the Multi-AP network 100. The Multi-AP Agent 131 may execute commands received from the Multi-AP Controller 111, and may report measurements and capability information of the fronthaul AP 132, the client device STA3, the backhaul STA 133, and the backhaul link to the Multi-AP Controller 111. The Multi-AP Controller 111 may use the reported measurements and capability information to provision or re-provision various wireless resources of the Multi-AP network 100 to the third Multi-AP device 130.

The fourth Multi-AP device 140 is configured to operate as a Multi-AP Agent, and is shown to include a Multi-AP Agent 141, a fronthaul AP 142, and a backhaul STA 143. The fronthaul AP 142 may facilitate communications between the fourth Multi-AP device 140 and one or more downstream devices. In some instances, the fronthaul AP 142 may establish a fourth BSS over which one or more associated client devices (such as STA4 and STA5) can access the Multi-AP network 100 over the wireless channel. In some instances, the backhaul STAs of a respective downstream Multi-AP device (not shown for simplicity) may associate with the fronthaul AP 142 of the fourth Multi-AP device 140 over the wireless channel based on the IEEE 802.11 wireless standards, thereby allowing the fourth Multi-AP device 140 and the respective downstream Multi-AP device to communicate with each other over the wireless channel associated with the fourth BSS. In the example of FIG. 1, the fronthaul AP 142 may facilitate communications with client devices STA4-STA5 over the wireless channel associated with the fourth BSS.

The backhaul STA 143 may facilitate communications between the fourth Multi-AP device 140 and one or more upstream devices (such as the Multi-AP Controller 111 and the Multi-AP Agent 121) over the backhaul link of the Multi-AP network 100. The Multi-AP Agent 141 may execute commands received from the Multi-AP Controller 111, and may report measurements and capability information of the fronthaul AP 142, the client devices STA4-STA5, the backhaul STA 143, and the backhaul link to the Multi-AP Controller 111. The Multi-AP Controller 111 may use the reported measurements and capability information to provision or re-provision various wireless resources of the Multi-AP network 100 to the fourth Multi-AP device 140.

In various implementations, the Multi-AP Controller 111 may use the reported measurements and capability information of the one or more Multi-AP devices to provision or re-provision various wireless resources of the Multi-AP network 100 to the Multi-AP Agents 121, 131, and 142 associated with respective Multi-AP devices 120, 130, and 140. In some implementations, the Multi-AP Controller 111 can onboard and provision the Multi-AP devices 120, 130, and 140 onto the Multi-AP network 100, and can facilitate layer-2 connectivity to the wireless channel of the Multi-AP network 100 for respective Multi-AP Agents 121, 131, and 141. In some instances, the Multi-AP Controller 111 may onboard the Multi-AP devices 120, 130, and 140 using a device provisioning protocol (DPP), a Multi-AP communication protocol, or a Push-button Configuration (PBC) backhaul STA onboarding procedure. The Multi-AP communication protocol may include the IEEE 1905.1 communication protocols and extensions to the 1905.1 communication protocols defined by other standards bodies. The PBC backhaul STA onboarding procedure allows an enrollee backhaul STA to use an extension to the PBC process to inform enrolled Multi-AP Agents that the enrollee backhaul STA is a backhaul STA.

The DPP, which may include provisioning protocols defined by the Wi-Fi EasyMesh™ Specification, may be used to enable layer-2 Wi-Fi connectivity for a backhaul STA and to secure the 1905-layer between an enrollee Multi-AP Agent and enrolled Multi-AP Agents in the Multi-AP network 100 via the Multi-AP Controller 111. In some instances, the DPP may be performed remotely during a pre-onboarding process by a network operator (not shown for simplicity) prior to deployment of Multi-AP devices. In some other instances, the DPP may be performed by the network operator during deployment and installation of Multi-AP devices. In some aspects, the network operator may be the owner of the Multi-AP devices, and may provide network services and other multimedia services to users.

In some implementations, the network operator may delegate a configurator role or capability to the Multi-AP Controller 111 for a pre-onboarding process, and may configure one or more of the Multi-AP Agents 121, 131, and 141 as DPP enrollees. During the pre-onboarding process, the Multi-AP Controller 111 may obtain configuration information from the Multi-AP Agents 121, 131, and 141, and exchange one or more IEEE 1905.1 packets with each of the Multi-AP Agents 121, 131, and 141 to establish the Multi-AP network 100 without user involvement.

Figure 2:
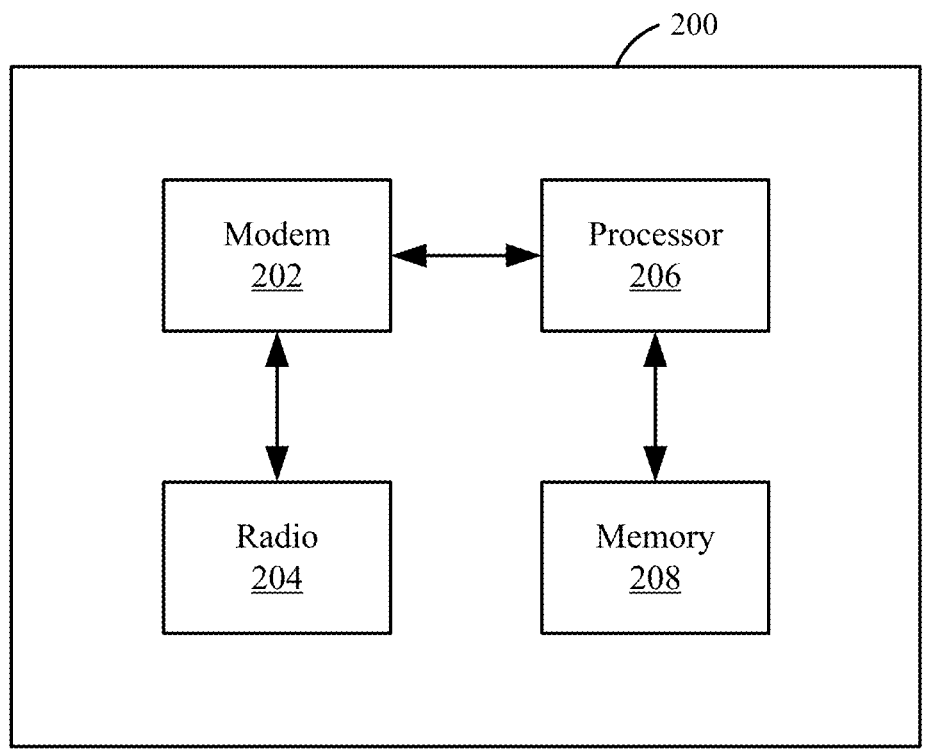
FIG. 2 shows a block diagram of an example wireless communication device.

FIG. 2 shows a block diagram of an example wireless communication device 200. In some implementations, the wireless communication device 200 can be an example of a device for use in a STA such as one of the backhaul STAs 123, 133, and 143 described with reference to FIG. 1. In other implementations, the wireless communication device 200 can be an example of a device for use in an AP such as one of the fronthaul APs 112, 122, and 132 described with reference to FIG. 1.

The wireless communication device 200 is capable of transmitting (or outputting for transmission) and receiving wireless communications (for example, in the form of wireless packets). For example, the wireless communication device 200 can be configured to transmit and receive packets in the form of physical layer convergence protocol (PLCP) protocol data units (PPDUs) and medium access control (MAC) protocol data units (MPDUs) conforming to an IEEE 802.11 standard, such as that defined by the IEEE 802.11-2016 specification or amendments thereof including, but not limited to, 802.11ah, 802.11ad, 802.11ay, 802.11ax, 802.11az, 802.11ba, and 802.11be.

The wireless communication device 200 can be, or can include, a chip, system on chip (SoC), chipset, package, or device that includes one or more modems 202, for example, a Wi-Fi (IEEE 802.11 compliant) modem. The one or more modems 202 (collectively "the modem 202") also may include a WWAN modem (for example, a 3GPP 4G LTE or 5G compliant modem). In some instances, the wireless communication device 200 also may include one or more radios 204 (collectively "the radio 204"). In some aspects, the wireless communication device 200 also may include one or more processors, processing blocks or processing elements (collectively "the processor 206"), and also may include one or more memory blocks or elements (collectively "the memory 208").

The modem 202 can include an intelligent hardware block or device such as, for example, an application-specific integrated circuit (ASIC), among other possibilities. The modem 202 is configured to implement a PHY layer that can modulate packets and to output the modulated packets to the radio 204 for transmission over the wireless medium. The modem 202 is configured to obtain modulated packets received by the radio 204 and to demodulate the packets to provide demodulated packets. In addition to a modulator and a demodulator, the modem 202 also may include digital signal processing (DSP) circuitry, automatic gain control (AGC), a coder, a decoder, a multiplexer, and a demultiplexer. For example, while in a transmission mode, data obtained from the processor 206 is provided to a coder, which encodes the data to provide encoded bits. The encoded bits are mapped to points in a modulation constellation (using a selected MCS) to provide modulated symbols. The modulated symbols may be mapped to a number $N_{SS}$ of spatial streams or a number $N_{STS}$ of space-time streams. The modulated symbols in the respective spatial or space-time streams may be multiplexed, transformed via an inverse fast Fourier transform (IFFT) block, and provided to the DSP circuitry for Tx windowing and filtering. The digital signals may be provided to a digital-to-analog converter (DAC). The resultant analog signals may be provided to a frequency upconverter, and the radio 204. In implementations involving beamforming, the modulated symbols in the respective spatial streams are precoded via a steering matrix prior to their provision to the IFFT block.

While in a reception mode, digital signals received from the radio 204 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/Q imbalance), and applying digital gain to obtain a narrowband signal. The output of the DSP circuitry may be fed to the AGC, which is configured to use information extracted from the digital signals, for example, in one or more received training fields, to determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from all of the spatial streams are fed to the demultiplexer for demultiplexing. The demultiplexed bits may be descrambled and provided to the MAC layer (the processor 206) for processing, evaluation, or interpretation.

The radio 204 includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may in turn be coupled to one or more antennas. For example, in some implementations, the wireless communication device 200 can include, or be coupled with, multiple transmit antennas (each with a corresponding transmit chain) and multiple receive antennas (each with a corresponding receive chain). The symbols output from the modem 202 are provided to the radio 204, which transmits the symbols via the coupled antennas. Similarly, symbols received via the antennas are obtained by the radio 204, which provides the symbols to the modem 202.

The processor 206 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 206 processes information received through the radio 204 and the modem 202, and processes information to be output through the modem 202 and the radio 204 for transmission through the wireless medium. For example, the processor 206 may implement a control plane and MAC layer configured to perform various operations related to the generation and transmission of MPDUs, frames, or packets. The MAC layer is configured to perform or facilitate the coding and decoding of frames, spatial multiplexing, space-time block coding (STBC), beamforming, and OFDMA resource allocation, among other operations or techniques. In some implementations, the processor 206 may control the modem 202 to cause the modem to perform various operations described herein.

The memory 208 can include tangible storage media such as random-access memory (RAM) or read-only memory (ROM), or combinations thereof. The memory 208 also can store non-transitory processor- or computer-executable software (SW) code containing instructions that, when executed by the processor 206, cause the processor to perform various operations described herein for wireless communication, including the generation, transmission, reception, and interpretation of MPDUs, frames or packets. For example, various functions of components disclosed herein, or various blocks or steps of a method, operation, process, or algorithm disclosed herein, can be implemented as one or more modules of one or more computer programs.

In some implementations, the processor 206 and the memory 208 may be components of a processing system. A processing system may generally refer to a system or series of machines or components that receives inputs and processes the inputs to produce a set of outputs (which may be passed to other systems or components of the wireless communication device 200). For example, a processing system of the wireless communication device 200 may refer to a system including the various other components or subcomponents of the wireless communication device 200.

Figure 3B:
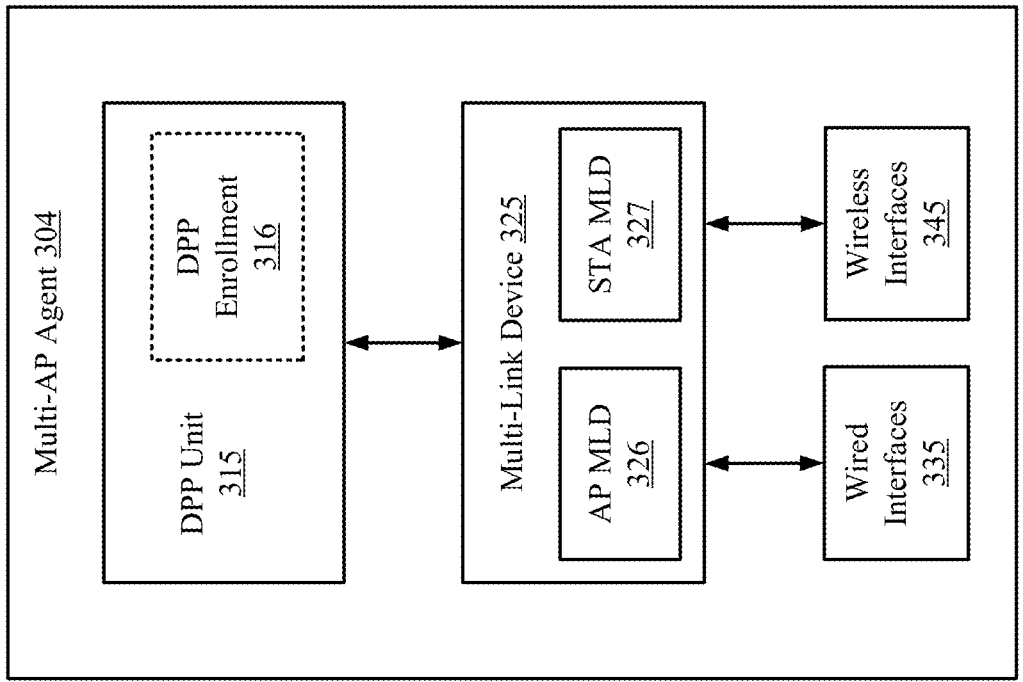
FIG. 3B shows a block diagram of an example Multi-AP Agent.
Figure 3A:
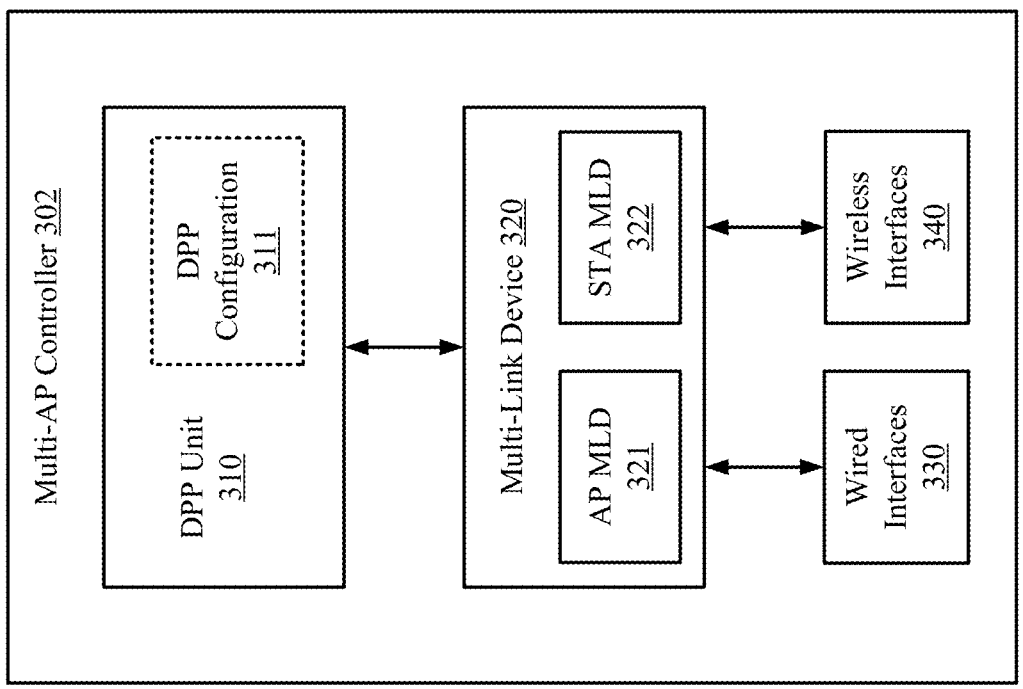
FIG. 3A shows a block diagram of an example Multi-AP Controller.

FIG. 3A shows a block diagram of an example Multi-AP Controller 302. In some instances, the Multi-AP Controller 302 may be an example of the Multi-AP Controller 111 implemented within various Multi-AP devices disclosed herein. The Multi-AP Controller 302 includes a DPP unit 310, a Multi-Link Device (MLD) 320, one or more wired interfaces 330, and one or more wireless interfaces 340. The DPP unit 310 may implement the DPP to onboard or provision one or more Multi-AP Agents onto one or more communication links or channels associated with a Multi-AP network (such as the Multi-AP network 100 described with reference to FIG. 1). In some instances, the DPP unit 310 may operate according to a particular network role defined in the DPP specification. For example, in some aspects, the DPP unit 310 may operate based on a DPP configuration, and perform operations associated with a DPP configurator.

The MLD 320 is shown to include an AP MLD 321 and a STA MLD 322. The AP MLD 321 may include (or may be associated with) a plurality of APs operating on a respective plurality of different communication links. For example, in some implementations, the AP MLD 321 may include a first AP that operates on one or more wireless channels in the 2.4 GHz frequency band, may include a second AP that operates on one or more wireless channels in the 5 GHz frequency band, and may include a third AP that operates on one or more wireless channels in the 6 GHz frequency band. In some aspects, the AP MLD 321 may operate according to the IEEE 802.11be or later amendments to the IEEE 802.11 wireless standard, and may be compatible with one or more of the IEEE 1905.1 communication protocols, the EasyMesh™ communication protocols, or the Multi-AP communication protocols. In some implementations, the AP MLD 321 may be used as the fronthaul AP of one or more Multi-AP devices disclosed herein.

The STA MLD 322 may include (or may be associated with) a plurality of STAs operating on a respective plurality of different communication links. For example, in some implementations, the STA MLD 322 may include a first STA that operates on one or more wireless channels in the 2.4 GHz frequency band, may include a second STA that operates on one or more wireless channels in the 5 GHz frequency band, and may include a third STA that operates on one or more wireless channels in the 6 GHz frequency band. In some aspects, the STA MLD 322 may operate according to the IEEE 802.11be or later amendments to the IEEE 802.11 wireless standard, and may be compatible with one or more of the IEEE 1905.1 communication protocols, the EasyMesh™ communication protocols, or the Multi-AP communication protocols. In some implementations, the STA MLD 322 may be used as the backhaul STA of one or more Multi-AP Controllers disclosed herein.

The wired interfaces 330 may be used for wired communications with other devices over wired mediums such (but not limited to) Ethernet, Coax, Powerline communications (PLC), or Multi-media over Coax (MoCA®), among other examples. The wireless interfaces 340 may be used for wireless communications with other devices over wireless mediums such (but not limited to) one or more Wi-Fi channels, Bluetooth® links, or cellular channels, among other examples.

FIG. 3B shows a block diagram of an example Multi-AP Agent 304. In some instances, the Multi-AP Agent 304 may be an example of the Multi-AP Agents implemented within various Multi-AP devices disclosed herein. The Multi-AP Agent 304 includes a DPP unit 315, an MLD 325, one or more wired interfaces 335, and one or more wireless interfaces 345. The DPP unit 315 may operate based on DPP enrollment 316, and may configure the Multi-AP Agent 304 to perform operations associated with a DPP enrollee. In some implementations, the DPP unit 315 may provide a Multi-AP Controller (such as the Multi-AP Controller 302 described with reference to FIG. 3A) with one or more of capabilities, parameters, profiles, or measurements, and the Multi-AP Controller may enroll the Multi-AP Agent 304 onto the Multi-AP network. In some instances, the Multi-AP Controller may provision layer-2 connectivity to the Multi-AP network for the Multi-AP Agent 304 using either a wireless medium or a wired connection. Once the Multi-AP Agent 304 gains layer-2 connectivity to the Multi-AP network, the Multi-AP Agent 304 may commence discovery of nearby Multi-AP Controllers or other Multi-AP Agents. In some aspects, the Multi-AP Controller may provision a fronthaul BSS and a backhaul BSS for the Multi-AP Agent 304 to access the Multi-AP network.

The MLD 325 is shown to include an AP MLD 326 and a STA MLD 327. The AP MLD 326 may include (or may be associated with) a plurality of APs operating on a respective plurality of different communication links. For example, in some implementations, the AP MLD 326 may include a first AP that operates on one or more wireless channels in the 2.4 GHz frequency band, may include a second AP that operates on one or more wireless channels in the 5 GHz frequency band, and may include a third AP that operates on one or more wireless channels in the 6 GHz frequency band. In some aspects, the AP MLD 326 may operate according to the IEEE 802.11be or later amendments to the IEEE 802.11 wireless standard, and may be compatible with one or more of the IEEE 1905.1 communication protocols, the EasyMesh™ communication protocols, or the Multi-AP communication protocols.

The STA MLD 327 may include (or may be associated with) a plurality of STAs operating on a respective plurality of different communication links. For example, in some implementations, the STA MLD 327 may include a first STA that operates on one or more wireless channels in the 2.4 GHz frequency band, may include a second STA that operates on one or more wireless channels in the 5 GHz frequency band, and may include a third STA that operates on one or more wireless channels in the 6 GHz frequency band. In some aspects, the STA MLD 322 may operate according to the IEEE 802.11be or later amendments to the IEEE 802.11 wireless standard, and may be compatible with one or more of the IEEE 1905.1 communication protocols, the EasyMesh™ communication protocols, or the Multi-AP communication protocols. In some implementations, the STA MLD 327 may be used as the backhaul STA of one or more Multi-AP Agents disclosed herein.

The wired interfaces 335 may be used for wired communications with other devices over wired mediums such (but not limited to) Ethernet, Coax, Powerline communications (PLC), or Multi-media over Coax (MoCA®), among other examples. The wireless interfaces 345 may be used for wireless communications with other devices over wireless mediums such (but not limited to) one or more Wi-Fi channels, Bluetooth® links, or cellular channels, among other examples.

Figure 4B:
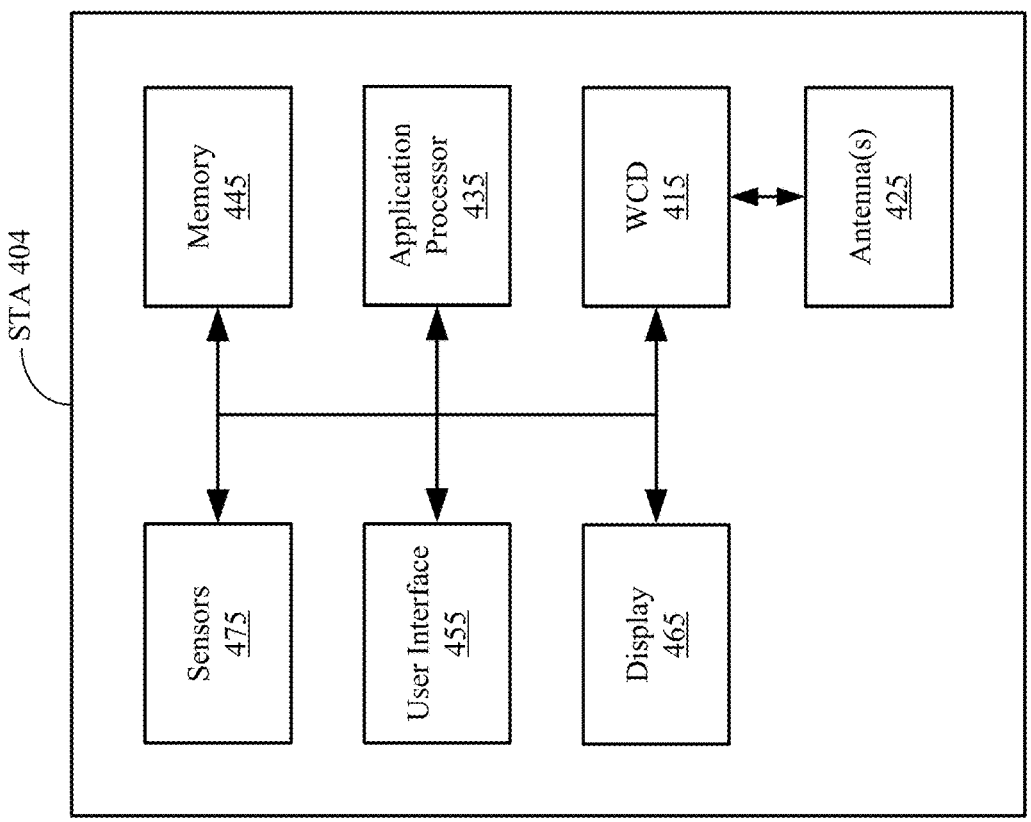
FIG. 4B shows a block diagram of an example Station (STA).
Figure 4A:
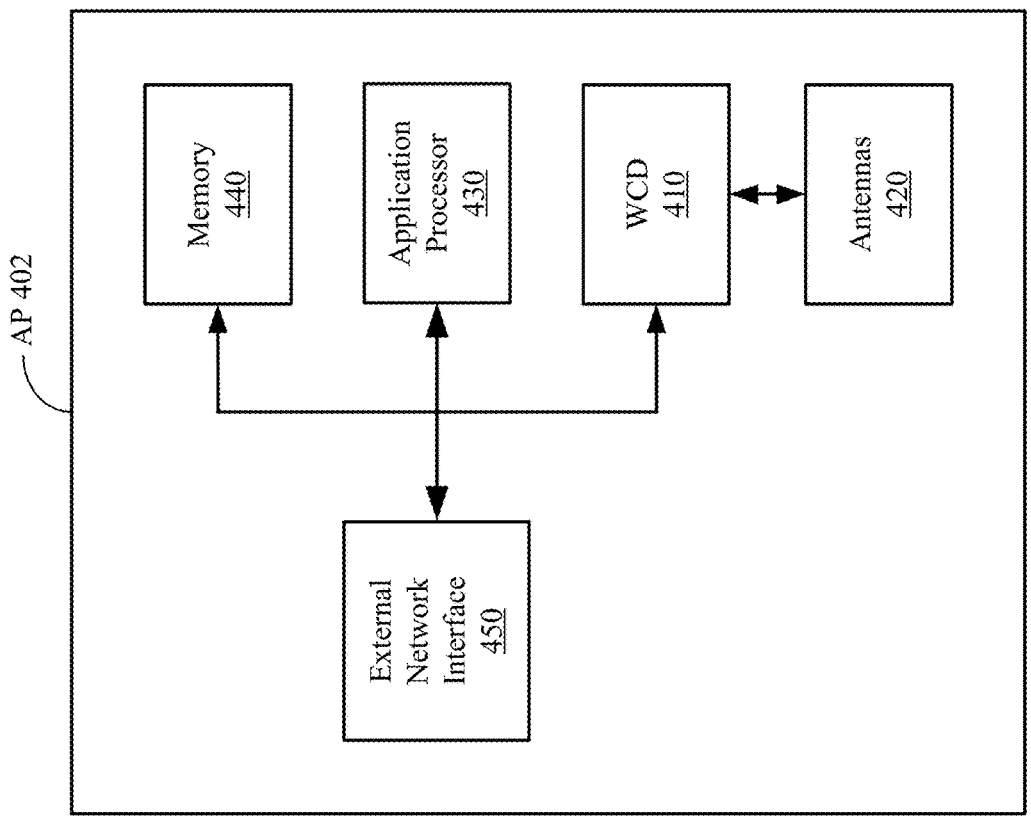
FIG. 4A shows a block diagram of an example Access Point (AP).

FIG. 4A shows a block diagram of an example AP 402. In some implementations, the AP 402 can be an example of one or more of the APs within or associated with one or more of the fronthaul APs 112, 122, 132, and 142 described with reference to FIG. 1. The AP 402 includes a wireless communication device (WCD) 410. In some instances, the wireless communication device 410 may be an example implementation of the wireless communication device 200 described with reference to FIG. 2. The AP 402 includes multiple antennas 420 coupled with the wireless communication device 410 to transmit and receive wireless communications. The AP 402 includes an application processor 430 coupled with the wireless communication device 410, and includes a memory 440 coupled with the application processor 430. The AP 402 also includes at least one external network interface 450 that enables the AP 402 to communicate with a core network or backhaul network to gain access to external networks including the Internet. For example, the external network interface 450 may include one or both of a wired (for example, Ethernet) network interface and a wireless network interface (such as a WWAN interface). Ones of the aforementioned components can communicate with other ones of the components directly or indirectly, over at least one bus. The AP 402 also may include a housing that encompasses the wireless communication device 410, the application processor 430, the memory 440, and at least portions of the antennas 420 and external network interface 450. In some implementations, the application processor 430 and the memory 440 may be components of a processing system. As discussed, a processing system may generally refer to a system or series of machines or components that receives inputs and processes the inputs to produce a set of outputs (which may be passed to other systems or components of the AP 402). For example, a processing system of the AP 402 may refer to a system including the various other components or subcomponents of the AP 402.

The processing system of the AP 402 may interface with other components of the AP 402, and may process information received from other components (such as inputs or signals), output information to other components, and the like. For example, a chip or modem of the AP 402 may include a processing system, a first interface to receive or obtain information, and a second interface to output or transmit information. In some instances, the first interface may refer to an interface between the processing system of the chip or modem and a receiver, such that the AP 402 may receive information or signal inputs, and the information may be passed to the processing system. In some instances, the second interface may refer to an interface between the processing system of the chip or modem and a transmitter, such that the AP 402 may transmit information output from the chip or modem. A person having ordinary skill in the art will readily recognize that the second interface also may obtain or receive information or signal inputs, and the first interface also may output, transmit or provide information.

FIG. 4B shows a block diagram of an example STA 404. In some implementations, the STA 404 can be an example of one or more of the STAs within or associated with one or more of the backhaul STA MLDs described with reference to FIG. 1. The STA 404 includes a wireless communication device 415. In some instances, the wireless communication device 415 may be an example implementation of the wireless communication device 200 described with reference to FIG. 2. The STA 404 includes one or more antennas 425 coupled with the wireless communication device 415 to transmit and receive wireless communications. The STA 404 includes an application processor 435 coupled with the wireless communication device 415, and includes a memory 445 coupled with the application processor 435. The STA 404 also may include a user interface (UI) 455 (such as a touchscreen or keypad) and a display 465, which may be integrated with the UI 455 to form a touchscreen display. In some implementations, the STA 404 also may include one or more sensors 475 such as, for example, one or more inertial sensors, accelerometers, temperature sensors, pressure sensors, or altitude sensors. Ones of the aforementioned components can communicate with other ones of the components directly or indirectly, over at least one bus. The STA 404 also may include a housing that encompasses the wireless communication device 415, the application processor 435, the memory 445, and at least portions of the antennas 425, UI 455, and display 465. In some implementations, the application processor 435 and the memory 445 may be components of a processing system. As discussed, a processing system may generally refer to a system or series of machines or components that receives inputs and processes the inputs to produce a set of outputs (which may be passed to other systems or components of the STA 404). For example, a processing system of the STA 404 may refer to a system including the various other components or sub-components of the STA 404.

The processing system of the STA 404 may interface with other components of the STA 404, and may process information received from other components (such as inputs or signals), output information to other components, and the like. For example, a chip or modem of the STA 404 may include a processing system, a first interface to receive or obtain information, and a second interface to output or transmit information. In some instances, the first interface may refer to an interface between the processing system of the chip or modem and a receiver, such that the STA 404 may receive information or signal inputs, and the information may be passed to the processing system. In some instances, the second interface may refer to an interface between the processing system of the chip or modem and a transmitter, such that the STA 404 may transmit information output from the chip or modem. A person having ordinary skill in the art will readily recognize that the second interface also may obtain or receive information or signal inputs, and the first interface also may output, transmit or provide information.

Figure 5:
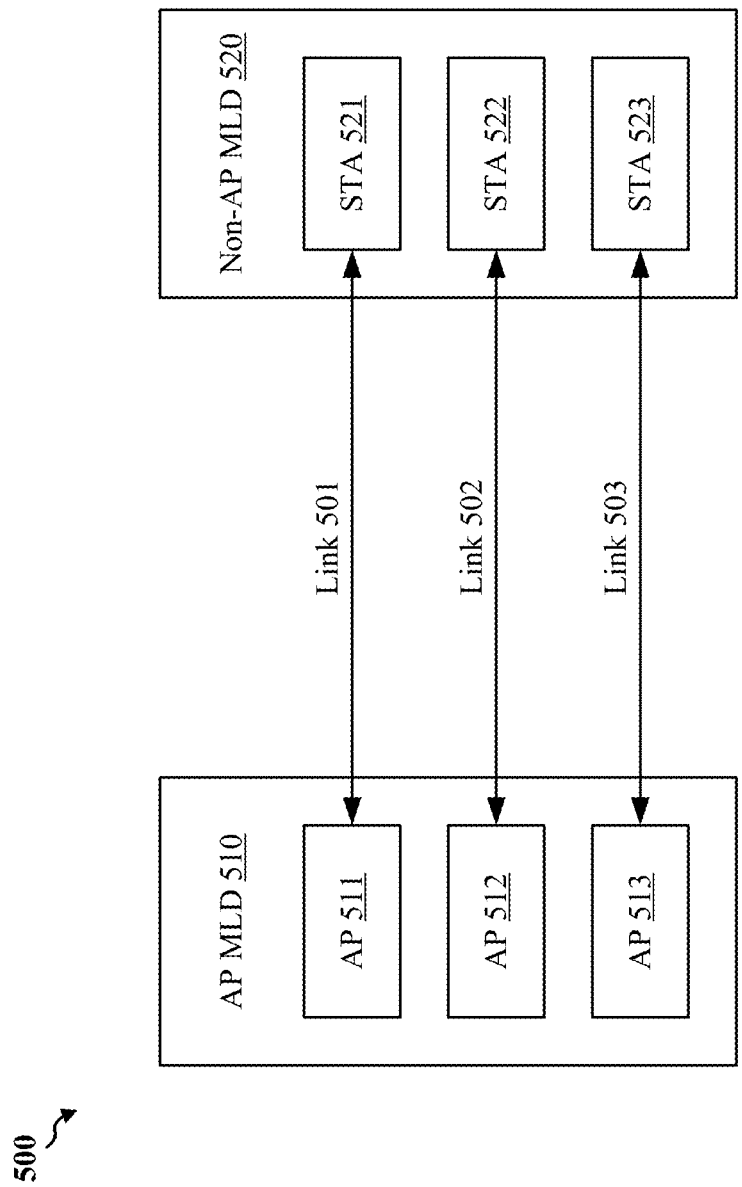
FIG. 5 shows an example communication system that includes an AP multi-link device (MLD) and a non-AP MLD.

FIG. 5 shows an example communication system 500 that includes an AP MLD 510 and a non-AP MLD 520. The AP MLD 510 may be one example of the wireless communication device 200 of FIG. 2, the AP MLD 321 of FIG. 3A, the AP MLD 326 of FIG. 3B, or the AP 402 of FIG. 4A. The non-AP MLD 520 may be one example of the wireless communication device 200 of FIG. 2, the STA MLD 322 of FIG. 3A, the STA MLD 327 of FIG. 3B, or the STA 404 of FIG. 4A. In some implementations, the AP MLD 510 and the STA MLD 520 may be implemented in Multi-AP devices that form a Multi-AP network. For example, in some aspects, the AP MLD 510 may be implemented as a fronthaul AP in a Multi-AP Controller or Multi-AP Agent, and the non-AP MLD 520 may be implemented as a backhaul STA in the Multi-AP Controller or Multi-AP Agent. In this way, a Multi-AP device including the AP MLD 510 as the fronthaul AP may be able to communicate with one or more downstream devices (such as client devices or the backhaul STAs of downstream Multi-AP devices) over multiple communication links, and a Multi-AP device including the STA MLD 520 as the backhaul STA may be able to communicate with one or more upstream devices (such as client devices or the fronthaul APs of upstream Multi-AP devices) over multiple communication links. As such, Multi-AP devices that include a fronthaul AP MLD and a backhaul STA MLD according to various aspects of the subject matter disclosed herein can implement multi-link operation (MLO) in a Multi-AP network (or other suitable mesh network).

In the example of FIG. 5, the AP MLD 510 includes three APs 511-513 associated with (or operating on) respective communication links 501-503. In some other implementations, the AP MLD 510 may include fewer or more APs than those depicted in FIG. 5. Although the APs 511-513 may share a common association context (through the AP MLD 510), each of the APs 511-513 may establish a respective BSS on the AP's associated communication link. The APs 511-513 also may establish their respective communication links 501-503 on different frequency bands. For example, the AP 511 may operate on the 2.4 GHz frequency band, the AP 512 may operate on the 5 GHz frequency band, and the AP 513 may operate on the 6 GHz frequency band.

The non-AP MLD 520 includes three STAs 521-523 that may be configured to communicate on the communication links 501-503, respectively. Specifically, the STA 521 may operate on the 2.4 GHz frequency band, the STA 522 may operate on the 5 GHz frequency band, and the STA 523 may operate on the 6 GHz frequency band. In the example of FIG. 5, the non-AP MLD 520 is shown to include only 3 STAs. In some other implementations, the non-AP MLD 520 may include fewer or more STAs than those depicted in FIG. 5.

The IEEE 802.11be amendment of the IEEE 802.11 standard defines several modes in which a non-AP MLD may operate. The various operating modes depend on the number of wireless radios associated with the non-AP MLD and the non-AP MLD's ability to communicate (such as by transmitting or receiving) concurrently on multiple communication links. In some implementations, the non-AP MLD 520 may include a single radio or may otherwise be capable of communicating on only one link at a time. In such implementations, the non-AP MLD 520 may operate in a multi-link single-radio (MLSR) mode or an enhanced MLSR (EMLSR) mode. A non-AP MLD operating in the EMLSR mode can listen for specific types of communications (such as buffer status report poll (BSRP) frames or multi-user request-to-send (MU-RTS) frames) on multiple communication links, concurrently, but can only transmit or receive on one communication link at any given time. For example, the STAs 521 and 522 may concurrently listen on their respective links 501 and 502 during a listen interval. However, if the STA 521 detects a BSRP frame on link 501, the non-AP MLD 520 subsequently tunes each of the non-AP MLD's antennas (including the antenna used by the STA 522 during the listen interval) to operate on link 501. By contrast, a non-AP MLD operating in the MLSR mode can only listen to, and transmit or receive on, one communication link at any given time. For example, the STA 521 must be in a power save mode at times during which the STA 522 is active.

In some other implementations, the non-AP MLD 520 may include multiple radios and may be capable of concurrent communications on each of the links 501-503. In such implementations, the non-AP MLD 520 may operate in a multi-link multi-radio (MLMR) simultaneous transmit and receive (STR) mode or a multi-link multi-radio non-STR (NSTR) mode. A non-AP MLD operating in the MLMR STR mode can simultaneously (or concurrently) transmit and receive on multiple communication links. For example, the STA 521 may transmit or receive on link 501 while the STA 522 concurrently transmits or receives on link 502, asynchronously. By contrast, a non-AP MLD operating in the MLMR NSTR mode can simultaneously transmit and receive on multiple communication links only if such communications are synchronous. For example, the STAs 522 and 523 may concurrently transmit on links 502 and 503 and may concurrently receive on links 502 and 503. However, the STA 522 cannot be transmitting on link 502 while the STA 523 is receiving on link 503.

Still further, a non-AP MLD may include multiple radios but may be capable of concurrent communications on only a subset of the links. In such implementations, the non-AP MLD 520 may operate in an enhanced MLMR (EMLMR) mode or a hybrid EMLSR mode. A non-AP MLD operating in the EMLMR mode supports MLMR STR operation between certain pairs of communication links. For example, the STAs 521 and 522 may concurrently communicate on their respective links 501 and 502 in accordance with the MLMR STR mode of operation.

Figure 6:
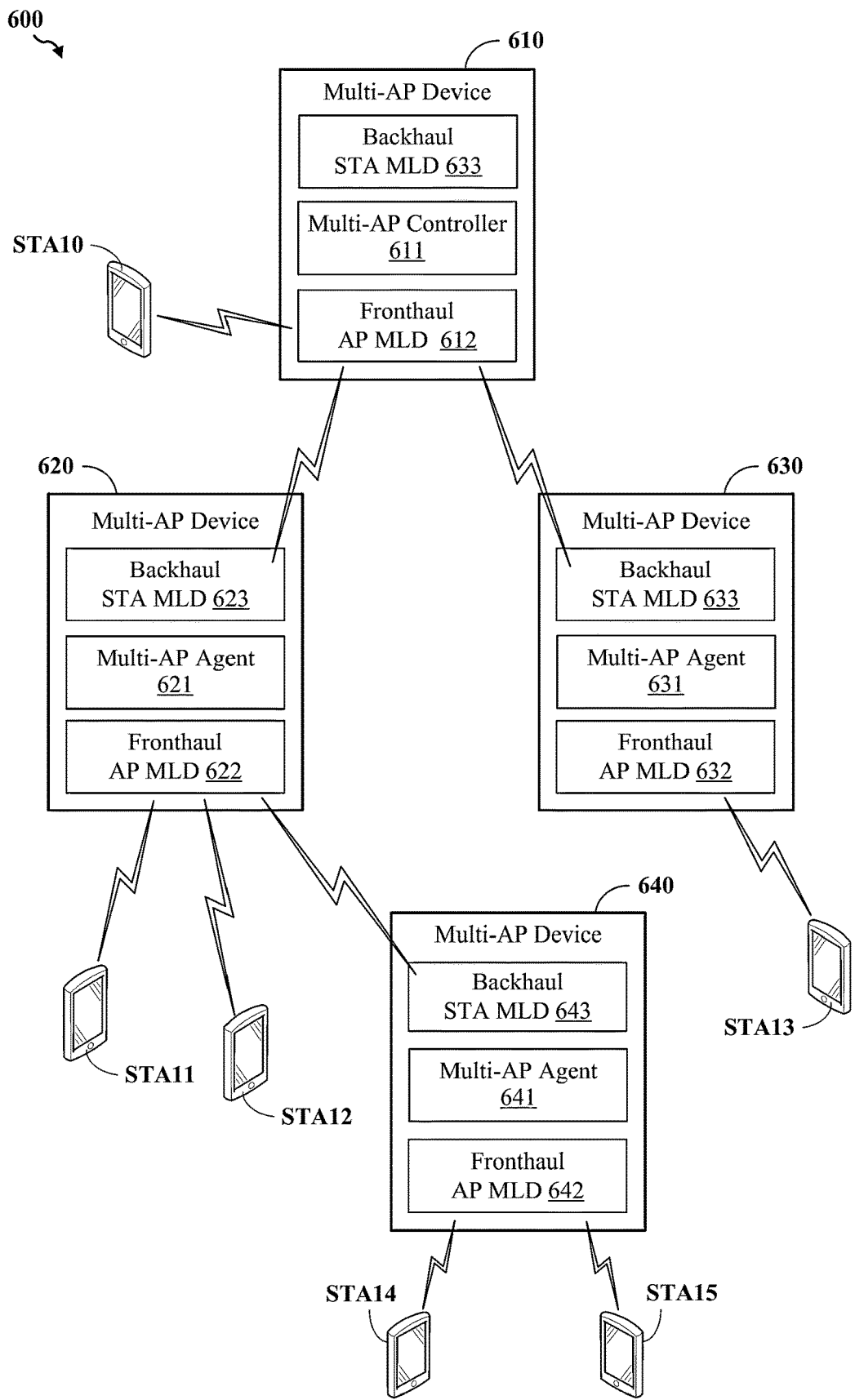
FIG. 6 shows an example Multi-AP network that supports multi-link operation (MLO).

FIG. 6 shows a block diagram of an example Multi-AP Network 600 that supports multi-link operation. In various implementations, the Multi-AP Network 600 may operate according to one or both of the Wi-Fi EasyMesh™ Specification or the Multi-AP™ Specification published by the Wi-Fi Alliance. In some implementations, the Multi-AP Network 600 also may be capable of multi-link operation (MLO) as defined in the IEEE 802.11be or later amendments to the IEEE 802.11 wireless standard.

The Multi-AP network 600 is shown to include four Multi-AP devices 610, 620, 630, and 640 connected to one another in a tree topology over one or more multi-link hops associated with the Multi-AP network 600. The tree topology may ensure that a single backhaul path can be established between any pair of Multi-AP devices in the Multi-AP network 600. Although the example of FIG. 6 shows four Multi-AP devices 610, 620, 630, and 640, in some other implementations, the Multi-AP Network 600 can include other numbers of Multi-AP devices. In some instances, a logical Multi-AP control interface (not shown for simplicity) may be defined between the Multi-AP devices 610, 620, 630, and 640 over which configuration and control functions for fronthaul APs and backhaul links are executed. In addition, a Multi-AP control interface (not shown for simplicity) may exist between the Multi-AP Controller and the Multi-AP Agents associated with the Multi-AP network 600.

The Multi-AP devices 610, 620, 630, and 640 may be any suitable wireless communication device capable of operating as a Multi-AP Controller or a Multi-AP Agent that also can establish multiple communication links between one another to form a mesh or other ad hoc network capable of MLO. In various implementations, each of the Multi-AP devices 610, 620, 630, and 640 may include an AP MLD and a STA MLD. In some implementations, each AP MLD may be an example of the AP MLD 510 described with reference to FIG. 5, and may include a first AP associated with a first communication link and one or more second APs associated with one or more respective second communication links. Each STA MLD may be an example of the non-AP MLD 520 described with reference to FIG. 5, and may include a first STA (or a "non-AP STA") associated with the first communication link and one or more second STAs associated with the one or more respective second communication links. In some aspects, each of the multiple communication links may include one or more wireless channels in a respective frequency band of the 2.4 GHz frequency band, the 5 GHz frequency band, the 6 GHz frequency band, or the 60 GHz frequency band.

In the example of FIG. 6, the first Multi-AP device 610 is configured to operate as a Multi-AP Controller, and is shown to include a Multi-AP Controller 611, a fronthaul AP MLD 612, and a backhaul STA MLD 613. The fronthaul AP MLD 612 may facilitate communications between the Multi-AP Controller 611 and one or more downstream devices, and may include a plurality of APs associated with a respective plurality of communication links of the Multi-AP Network 600. In some implementations, each of the APs associated with the fronthaul AP MLD 612 may establish a respective BSS over which one or more downstream devices (such as client devices and Multi-AP devices) can access the Multi-AP network 600. In the example of FIG. 6, the fronthaul AP MLD 612 provides multiple communication links on which a client device STA10 and the second Multi-AP device 620 can associate with the fronthaul AP MLD 612 based on the IEEE 802.11 wireless standards. In this way, the fronthaul AP MLD 612 may communicate with client device STA10 and the second Multi-AP device 620 over multiple communication links of the Multi-AP Network 600, concurrently.

The backhaul STA MLD 613 may facilitate communications between the first Multi-AP device 610 and one or more upstream devices (not shown for simplicity) over one or more backhaul links of the Multi-AP network 600. The Multi-AP Controller 611 may control various operations of the fronthaul AP MLD 612, the backhaul STA MLD 613, and one or more corresponding backhaul links. In some instances, the Multi-AP Controller 611 may facilitate onboarding and provisioning procedures that join other Multi-AP devices to the Multi-AP network 600.

The second Multi-AP device 620 is configured to operate as a first Multi-AP Agent, and is shown to include a Multi-AP Agent 621, a fronthaul AP MLD 622, and a backhaul STA MLD 623. The fronthaul AP MLD 622 may facilitate communications between the first Multi-AP Agent 621 and one or more downstream devices, and may include a plurality of APs associated with the respective plurality of communication links. In some implementations, each of the APs associated with the fronthaul AP MLD 622 may establish a respective BSS over which one or more downstream devices (such as client devices and Multi-AP devices) can access the Multi-AP network 600 over multiple communication links. In the example of FIG. 6, the fronthaul AP MLD 622 provides multiple communication links over which client devices STA11-STA12 and the fourth Multi-AP device 640 can associate with the fronthaul AP MLD 622 based on the IEEE 802.11 wireless standards. In this way, the fronthaul AP MLD 622 may communicate with client devices STA11-STA12 and fourth Multi-AP device 640 over multiple communication links of the Multi-AP Network 600, concurrently.

The backhaul STA MLD 623 may facilitate communications between the second Multi-AP device 620 and one or more upstream devices (such as the Multi-AP Controller 611) over one or more backhaul links of the Multi-AP network 600. The first Multi-AP Agent 621 may execute commands received from the Multi-AP Controller 611, and may report measurements and capability information of the fronthaul AP MLD 622, the client devices STA11-STA12, the backhaul STA MLD 623, and the one or more backhaul links to the Multi-AP Controller 611. The first Multi-AP Agent 621 also may perform various operations and procedures responsive to instructions or commands provided by the Multi-AP Controller 611 (or by one or more Multi-AP Agents associated with the Multi-AP Network 600).

The third Multi-AP device 630 is configured to operate as a second Multi-AP Agent, and is shown to include a Multi-AP Agent 631, a fronthaul AP MLD 632, and a backhaul STA MLD 633. The fronthaul AP MLD 632 may facilitate communications between the second Multi-AP Agent 631 and one or more downstream devices, and may include a plurality of APs associated with the respective plurality of communication links. In some implementations, each of the APs associated with the fronthaul AP MLD 632 may establish a respective BSS over which one or more downstream devices (such as client devices and Multi-AP devices) can access the Multi-AP network 600. In the example of FIG. 6, the fronthaul AP MLD 632 provides multiple communication links over which client device STA13 and one or more downstream Multi-AP devices (not shown for simplicity) can associate with the fronthaul AP MLD 632 based on the IEEE 802.11 wireless standards. In this way, the fronthaul AP MLD 632 may communicate with client device STA13 and the one or more downstream Multi-AP devices over multiple communication links of the Multi-AP Network 600, concurrently.

The backhaul STA MLD 633 may facilitate communications between the third Multi-AP device 630 and one or more upstream devices (such as the Multi-AP Controller 611) over the one or more backhaul links of the Multi-AP network 600. The second Multi-AP Agent 631 may execute commands received from the Multi-AP Controller 611, and may report measurements and capability information of the fronthaul AP MLD 632, client device STA13, the backhaul STA MLD 633, and the one or more backhaul links to the Multi-AP Controller 611. The second Multi-AP Agent 631 also may perform various operations and procedures responsive to instructions or commands provided by the Multi-AP Controller 611 (or by one or more Multi-AP Agents associated with the Multi-AP Network 600).

The fourth Multi-AP device 640 is configured to operate as a third Multi-AP Agent, and is shown to include a Multi-AP Agent 641, a fronthaul AP MLD 642, and a backhaul STA MLD 643. The fronthaul AP MLD 642 may facilitate communications between the third Multi-AP Agent 641 and one or more downstream devices, and may include a plurality of APs associated with the respective plurality of communication links. In some implementations, each of the APs associated with the fronthaul AP MLD 642 may establish a respective BSS over which one or more downstream devices (such as client devices and Multi-AP devices) can access the Multi-AP network 600. In the example of FIG. 6, the fronthaul AP MLD 642 provides multiple communication links over which client devices STA14-STA15 and one or more downstream Multi-AP devices (not shown for simplicity) can associate with the fronthaul AP MLD 642 based on the IEEE 802.11 wireless standards. In this way, the fronthaul AP MLD 642 may communicate with client devices STA14-STA15 and the one or more downstream Multi-AP devices over multiple communication links of the Multi-AP Network 600, concurrently.

The backhaul STA MLD 643 may facilitate communications between the third Multi-AP device 640 and one or more upstream devices (such as the Multi-AP Controller 611 and the first Multi-AP Agent 621) over the one or more backhaul links of the Multi-AP network 600. The third Multi-AP Agent 641 may execute commands received from the Multi-AP Controller 611, and may report measurements and capability information of the fronthaul AP MLD 642, client devices STA14-STA15, the backhaul STA MLD 643, and the one or more backhaul links to the Multi-AP Controller 611. The third Multi-AP Agent 641 also may perform various operations and procedures responsive to instructions or commands provided by the Multi-AP Controller 611 (or by one or more Multi-AP Agents associated with the Multi-AP Network 600).

In various implementations, the Multi-AP Controller 611 (or one or more Multi-AP Agents) may use the reported measurements and capability information of the Multi-AP devices 620, 630, and 640 to provision or re-provision various wireless resources of the Multi-AP network 600 to the respective Multi-AP Agents 621, 631, and 641. In some implementations, the Multi-AP Controller 611 can onboard and provision the Multi-AP devices 620, 630, and 640 onto the Multi-AP network 600 by establishing layer-2 connectivity to each of the multiple communication links associated with the Multi-AP network 600 for the respective Multi-AP Agents 621, 631, and 641. In some instances, the Multi-AP Controller 611 may onboard the Multi-AP devices 620, 630, and 640 using one or more of the DPP, the Multi-AP communication protocol, or the PBC backhaul STA onboarding procedure.

As discussed, the Multi-AP communication protocol may include the IEEE 1905.1 communication protocols and extensions to the 1905.1 communication protocols defined by other standards bodies. The PBC backhaul STA onboarding procedure allows an enrollee backhaul STA to use an extension to the PBC process to inform enrolled Multi-AP Agents that the enrollee backhaul STA is a backhaul STA MLD. The DPP may include provisioning protocols defined by the Wi-Fi EasyMesh™ Specification, and may be used to enable layer-2 Wi-Fi connectivity for a backhaul STA and to secure the 1905-layer between an enrollee Multi-AP Agent and enrolled Multi-AP Agents in the Multi-AP network 600 via the Multi-AP Controller 611.

In various implementations, the Multi-AP Controller 611 may establish the Multi-AP Network by onboarding the Multi-AP Agents 621, 622, and 623 using both the DPP and Multi-AP communication protocols, such as the 1905.1 communication protocols. In some instances, a network operator (not shown for simplicity) may perform the DPP remotely during a pre-onboarding process prior to deployment of the Multi-AP Controller 611 and the Multi-AP Agents 621, 631, and 641 to the destination. For example, during the pre-onboarding process, the network operator may take the network role of the DPP configurator and perform the DPP for the Multi-AP Controller 611 and the Multi-AP Agents 621, 631, and 641.

In some other implementations, configuration information (such as DPP configuration information) for each of the Multi-AP Controller 611 and the Multi-AP Agents 621, 631, and 641 may be generated and stored by the network operator during DPP procedures. In some instances, the network operator may store the DPP configuration information in a database that associates the DPP configuration information with the corresponding Multi-AP Network (in a household, office, or other location). The DPP configuration information may be used by the network operator to remotely manage the Multi-AP devices 610, 620, 630, and 640. During the pre-onboarding process, the network operator also may delegate a configurator role or capability to the Multi-AP Controller 611 by configuring a DPP unit of the Multi-AP Controller 611 as a DPP configurator prior to deployment. The Multi-AP Agents 621, 631, and 641 may be configured as DPP enrollees (which may be referred to as DPP peers after the onboarding process).

As discussed, aspects of the present disclosure recognize that employing AP MLDs and STA MLDs in Multi-AP devices to enable multi-link operation (MLO) in a Multi-AP Network may be associated with the exchange of MLO association information, capabilities, and configuration information between the Multi-AP devices. Specifically, although MLO is supported in infrastructure WLANs operating according to the 802.11be amendments to the IEEE 802.11 wireless standard, MLO is not currently supported in mesh networks configured according to the Wi-Fi EasyMesh™ Specification or the Multi-AP Specification provided by the Wi-Fi Alliance. Moreover, IEEE 1905.1 management frames and messages communicated over a Multi-AP Network may not be configured to carry MLO association information, MLO capabilities, or MLO configuration information.

In various implementations, at least sone of the IEEE 1905.1 frames or messages that carry data and other information in a Multi-AP Network can be modified to carry or indicate one or more of MLO association information, MLO capabilities, and MLO configuration information of a respective Multi-AP device, the fronthaul AP MLD of the respective Multi-AP device, or the backhaul STA MLD of the respective Multi-AP device, among other examples. For example, in some implementations, one or more first IEEE 1905.1 frames or messages may include one or both of a DPP Configuration object or an MLD address field of the DPP Configuration object that can carry MLO association information, MLO capabilities, and MLO configuration information. In some other implementations, one or more second IEEE 1905.1 frames or messages may include an MLO Support Type-Length-Value (TLV) indicating MLO capabilities of one or both of the fronthaul AP MLD or the backhaul STA MLD of a respective Multi-AP device. In some instances, one or more third IEEE 1905.1 frames or messages may include or indicate Traffic Identifier (TID)-to-Link Mappings associated with the fronthaul AP MLD and backhaul STA MLD of the respective Multi-AP device.

By modifying IEEE 1905.1 management frames and messages exchanged between Multi-AP devices to carry MLO capabilities, MLO association information, and MLO configuration information of Multi-AP devices operating as Multi-AP Agents in a Multi-AP Network, aspects of the present disclosure may enable MLO between Multi-AP devices associated with the Multi-AP Network. Specifically, by employing an AP MLD and a STA MLD as the fronthaul AP and backhaul STA, respectively, of a Multi-AP device, aspects of the present disclosure allow the Multi-AP devices to communicate with one another on multiple communication links, thereby increasing the effective bandwidth of a Multi-AP Network (such as compared to conventional single-link Multi-AP Networks).

Figure 7:
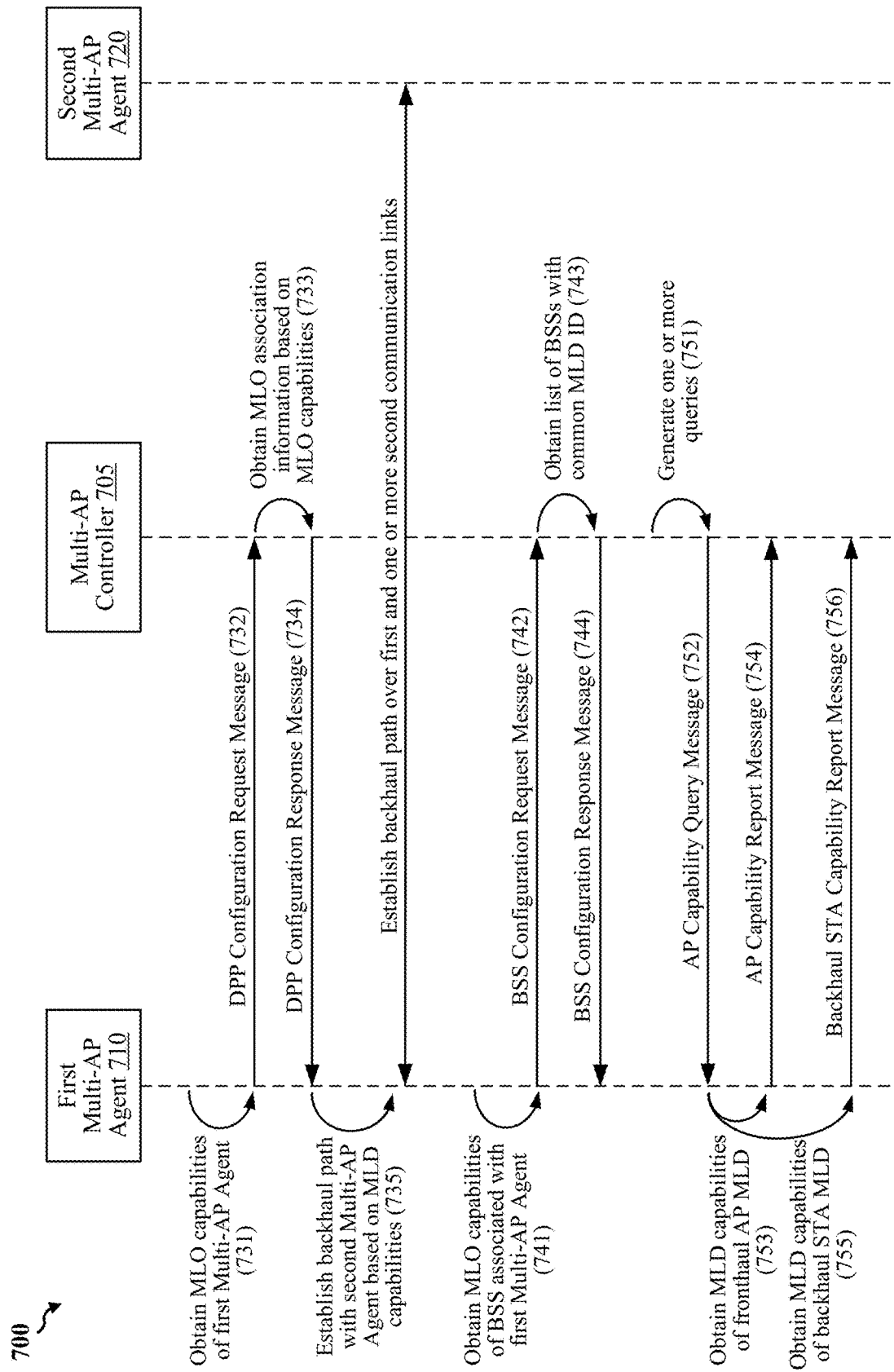
FIG. 7 shows an example sequence diagram for wireless communications that support MLO in a Multi-AP network.

FIG. 7 shows a sequence diagram of an example wireless communication 700 that supports multi-link operation in a Multi-AP network. The wireless communication 700 may be performed between a Multi-AP Controller 705, a first Multi-AP Agent 710, and a second Multi-AP Agent 720. The Multi-AP Controller 705 may be one example of the wireless communication device 200 of FIG. 2, the Multi-AP Controller 302 of FIG. 3A, or the first Multi-AP device 610 of FIG. 6. The first and second Multi-AP Agents 710 and 720 may be examples of the wireless communication device 200 of FIG. 2, the Multi-AP Agent 304 of FIG. 3B, or one or more of the Multi-AP Agents 620, 630, or 640 of FIG. 6. In some instances, the Multi-AP Network may be an example of the Multi-AP Network 600 of FIG. 6.

The Multi-AP Controller 705 may include a fronthaul AP MLD and a backhaul STA MLD (not shown for simplicity). The fronthaul AP MLD may include a plurality of APs that operate on a plurality of communication links, and the backhaul STA MLD may include a plurality of STAs that operate on the respective plurality of communication links. Each AP included in the fronthaul AP MLD can establish a corresponding first BSS on a respective communication link to enable multi-link communications with one or more downstream devices associated with the first BSS. Each STA included in the backhaul STA MLD can associate with a corresponding BSS established by a respective AP of the fronthaul AP MLD of an upstream device (not shown for simplicity). In some implementations, the Multi-AP Controller 705 may be configured to onboard the first and second Multi-AP Agents 710 and 720 according to the DPP. In some other implementations, the Multi-AP Controller 705 may be configured to onboard the first and second Multi-AP Agents 710 and 720 according to the Multi-AP communication protocol.

The first Multi-AP Agent 710 may include a fronthaul AP MLD including a plurality of APs that can establish corresponding BSSs on the respective plurality of communication links, and may include a backhaul STA MLD including a plurality of STAs that can associate with respective BSSs established by the fronthaul AP MLD of the Multi-AP Controller 705. In this way, the fronthaul AP MLD of the first Multi-AP Agent 710 can enable multi-link communications with one or more downstream devices (such as the second Multi-AP Agent 720), and the backhaul STA MLD of the first Multi-AP Agent 710 can enable multi-link communications with one or more upstream devices (such as the Multi-AP Controller 705).

The second Multi-AP Agent 720 may include a fronthaul AP MLD including a plurality of APs that can establish corresponding BSSs on the respective plurality of communication links, and may include a backhaul STA MLD including a plurality of STAs that can associate with respective BSSs established by the fronthaul AP MLD of the first Multi-AP Agent 710. In this way, the fronthaul AP MLD of the second Multi-AP Agent 720 can enable multi-link communications with one or more downstream devices (not shown for simplicity), and the backhaul STA MLD of the second Multi-AP Agent 720 can enable multi-link communications with one or more upstream devices (such as the first Multi-AP Agent 720).

In some implementations, the first Multi-AP Agent 710 may establish a backhaul connection with the second Multi-AP Agent 720. For example, at 731, the first Multi-AP Agent 710 obtains MLO capability information for each STA of the backhaul STA MLD of the first Multi-AP Agent 710. At 732, the first Multi-AP Agent 710 sends a Device Provisioning Protocol (DPP) Configuration Request Message to the Multi-AP Controller 705 over a first communication link of the Multi-AP Network. The DPP Configuration Request Message may indicate the MLO capabilities for all STAs of the backhaul STA MLD associated with the first Multi-AP Agent 710. In some aspects, the MLO capabilities may be indicated in a DPP Configuration Object carried in the DPP Configuration Request Message.

At 733, the Multi-AP Controller 705 receives the DPP Configuration Request Message carrying the MLO capabilities for the backhaul STA MLD of the first Multi-AP Agent 710, and obtains MLO association information for the first Multi-AP Agent 710 based on the received MLO capabilities. At 734, the Multi-AP Controller 705 sends a DPP Configuration Response Message to the first Multi-AP Agent 710 over the first communication link. The DPP Configuration Response Message may indicate the MLO association information for the first Multi-AP Agent 710. In some aspects, the MLO association information may be indicated in an MLD address field of a DPP Configuration Object carried in the DPP Configuration Response Message. At 735, the first Multi-AP Agent 710 establishes a backhaul path with the second Multi-AP Agent 720 on multiple communication links of the Multi-AP Network according to the MLO association information provided by the Multi-AP Controller 705.

In some other implementations, the first Multi-AP Agent 710 also may configure one or more BSSs on one or more respective communication links of the Multi-AP Network. For example, at 741, the first Multi-AP Agent 710 obtains the MLO capabilities of the BSSs established by the backhaul STA MLD of the first Multi-AP Agent 710. At 742, the first Multi-AP Agent 710 sends a Basic Service Set (BSS) Configuration Request message to the Multi-AP Controller 705 over the first communication link. The BSS Configuration Request message may indicate the MLO capabilities of the backhaul STA MLD of the first Multi-AP Agent 710. At 743, the Multi-AP Controller 705 receives the BSS Configuration Request message indicating the MLO capabilities of the backhaul STA MLD of the first Multi-AP Agent 710, and obtains a list of BSSs with the same or common MLD ID. In some aspects, the list of BSSs may be indicated in a DPP Configuration Object carried in the BSS Configuration Request Message. At 744, the Multi-AP Controller 705 sends a BSS Configuration Response Message to the first Multi-AP Agent 710 over the first communication link. The BSS Configuration Response Message may indicate one or more BSSs associated with the same or common MLD ID. In some aspects, the one or more BSSs associated with the common MLD ID may be indicated in the MLD address field of a DPP Configuration Object carried in the BSS Configuration Response Message. In some other aspects, the Multi-AP Controller 705 may send a BSS Configuration Result Message to the first Multi-AP Agent 710 over the first communication link. The BSS Configuration Result Message may include an MLD Configuration Report TLV indicating the number of MLDs reported in the BSS Configuration Result Message, the MLD MAC address, the number of BSSs operating within the MLD, and the MAC address of the BSS, among other examples.

In some other implementations, the first Multi-AP Agent 710 may provide MLO capability information of its fronthaul AP MLD or backhaul STA MLD responsive to a request from the Multi-AP Controller 705. For example, at 751, the Multi-AP Controller 705 generates one or more queries for MLO capability information associated with the first Multi-AP Agent 710. At 752, the Multi-AP Controller 705 sends an AP Capability Query message to the first Multi-AP Agent 710 over the first communication link. In some instances, the AP Capability Query message may include a request for the MLO capabilities of the fronthaul AP MLD of the first Multi-AP Agent 710. For example, at 753, the first Multi-AP Agent 710 receives the request, and obtains MLO capability information for each of the APs associated with the fronthaul AP MLD of the first Multi-AP Agent 710. At 754, the first Multi-AP Agent 710 sends an AP Capability Report message to the Multi-AP Controller 705 over the first communication link. The AP Capability Report message may indicate the MLO capabilities of the APs associated with the fronthaul AP MLD of the first Multi-AP Agent 710. In some aspects, the MLO capabilities may be indicated in an MLO Support Type-Length-Value (TLV) of the AP Capability Report message. The MLO Support TLV may indicate the MAC address of the fronthaul AP MLD, IEEE 802.11be EML Capabilities of the fronthaul AP MLD, IEEE 802.11be MLD Capabilities of the fronthaul AP MLD, the number of Links associated with the fronthaul AP MLD, a Link ID, a MAC address of the Link, an Operating Class of the fronthaul AP MLD, and a Channel Number of the fronthaul AP MLD, among other examples.

In some other instances, the AP Capability Query message may include a request for the MLO capabilities of the backhaul STA MLD of the first Multi-AP Agent 710. For example, at 755, the first Multi-AP Agent 710 receives the request, and obtains MLO capability information for each of the STAs associated with the backhaul STA MLD of the first Multi-AP Agent 710. At 756, the first Multi-AP Agent 710 sends a Backhaul STA Capability Report message indicating the MLO capabilities of the backhaul STA MLD to the Multi-AP Controller 705 over the first communication link. In some aspects, the MLO capabilities may be indicated in an MLO Support TLV of the Backhaul STA Capability Report message. The MLO Support TLV may indicate the MAC address of the backhaul STA MLD, IEEE 802.11be EML Capabilities of the backhaul STA MLD, IEEE 802.11be MLD Capabilities of the backhaul STA MLD, the number of Links associated with the backhaul STA MLD, a Link ID, a MAC address of the Link, an Operating Class of the backhaul STA MLD, and a Channel Number of the backhaul STA MLD, among other examples.

Figure 8:
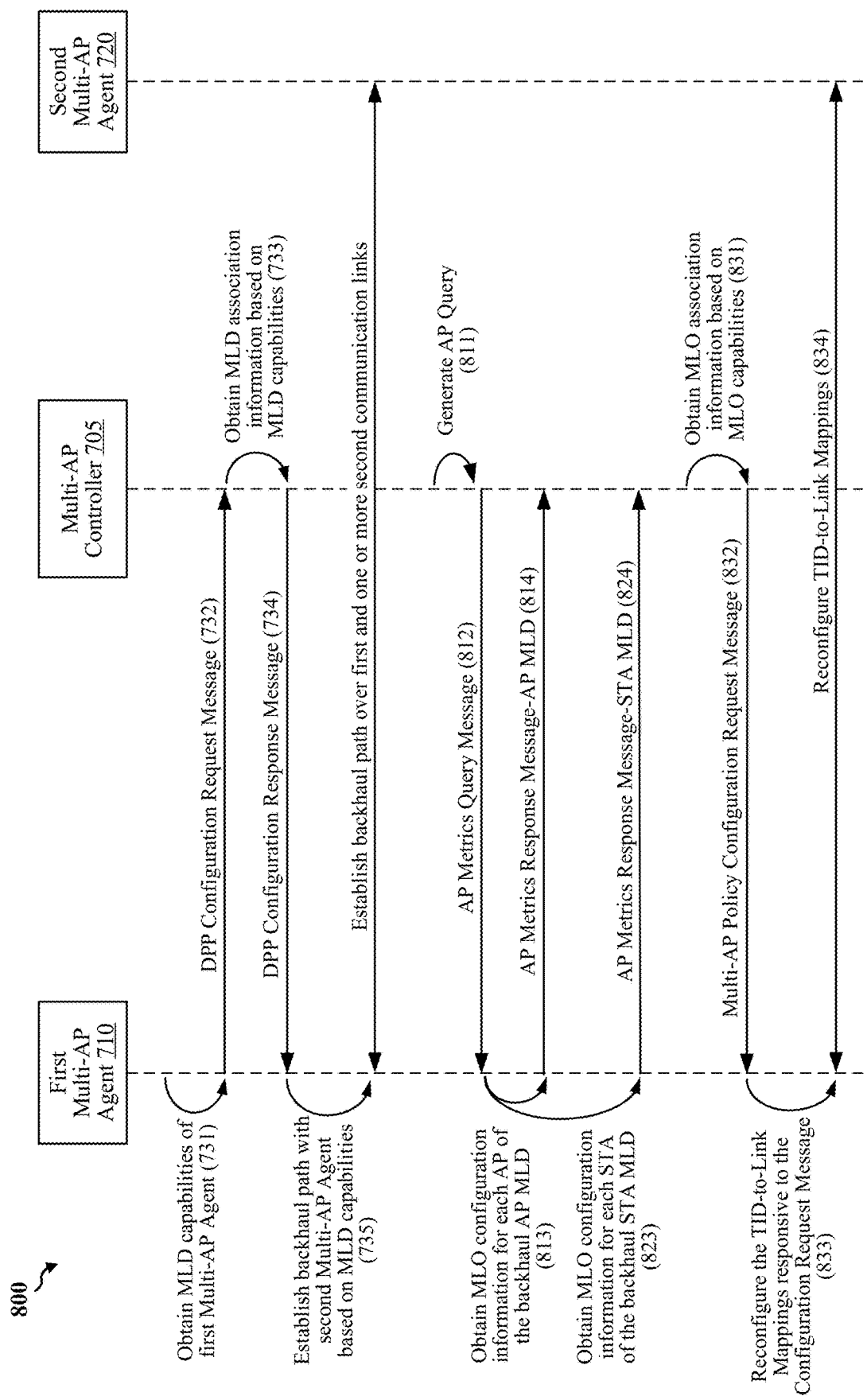
FIG. 8 shows another example sequence diagram for wireless communications that support MLO in a Multi-AP network.

FIG. 8 shows a sequence diagram of another example wireless communication 800 that supports multi-link operation in a Multi-AP network. The wireless communication 800 may be performed between Multi-AP Controller 705, the first Multi-AP Agent 710, and the second Multi-AP Agent 720 described with reference to FIG. 7. In various implementations, the operations 731-735 associated with the first Multi-AP Agent 710 establishing a backhaul link with the second Multi-AP Agent 720 of FIG. 8 may be the same as, or at least similar to, the operations 731-735 described with reference to FIG. 7.

In some implementations, the first Multi-AP Agent 710 may provide MLO configuration information of its fronthaul AP MLD responsive to a request from the Multi-AP Controller 705. For example, at 811, the Multi-AP Controller 705 generates a query for the MLO configuration information of the fronthaul AP MLD of the first Multi-AP Agent 710. At 812, the Multi-AP Controller 705 sends an AP Metrics Query message to the first Multi-AP Agent 710 over the first communication link. The AP Metrics Query message may include a request for the first Multi-AP Agent 710 to provide or indicate the MLO configuration information of its fronthaul AP MLD. At 813, the first Multi-AP Agent 710 receives the request, and obtains the MLO configuration information for its fronthaul AP MLD. At 814, the first Multi-AP Agent 710 sends an AP Metrics Response message to the Multi-AP Controller 705 over the first communication link. The AP Metrics Response message may indicate the MLO configuration information of the fronthaul AP MLD of the first Multi-AP Agent 710. In some aspects, the MLO configuration information may be indicated in an MLO Support TLV of the AP Metrics Response message.

In various implementations, the AP Metrics Query message also may include a request for the first Multi-AP Agent 710 to provide or indicate the MLO configuration information of its backhaul STA MLD. For example, at 823, the first Multi-AP Agent 710 receives the request, and obtains the MLO configuration information for its backhaul STA MLD. At 824, the first Multi-AP Agent 710 sends an AP Metrics Response message to the Multi-AP Controller 705 over the first communication link. In some implementations, the AP Metrics Response message may include one or more Associated Non-AP Operation TLVs for one or more respective STAs of the STA MLD of the first Multi-AP Agent 710. In some instances, each Associated Non-AP Operation TLV may include or indicate the MLO configuration information of the respective STA of the backhaul STA MLD. For example, each Associated Non-AP Operation TLV may indicate the MAC address of the fronthaul AP MLD of the Multi-AP Controller 705, the MAC address of the backhaul STA MLD of a respective Multi-AP Agent, the number of Links, the Link ID, an Operating Class of the backhaul STA MLD of the respective Multi-AP Agent, the Channel Number, a Presence Bitmap, a TID Bitmap, and a number of TIDs, among other examples. In some other instances, each Associated Non-AP Operation TLV may include or indicate a configuration between a respective AP of the fronthaul AP MLD and a respective STA of the backhaul STA MLD of the first Multi-AP Agent 710. In some other instances, each Associated Non-AP Operation TLV may include or indicate Traffic Identifier (TID)-to-Link Mappings associated with the fronthaul AP MLD and the backhaul STA MLD of the first Multi-AP Agent 710.

In some implementations, the first Multi-AP Agent 710 may reconfigure one or more TID-to-Link Mappings responsive to a request from the Multi-AP Controller 705. For example, at 831, the Multi-AP Controller 705 obtains MLO association information based on the indicated MLO capabilities. At 832, the Multi-AP Controller 705 sends a Multi-AP Policy Configuration Request message to the first Multi-AP Agent 710 over the first communication link. The Multi-AP Policy Configuration Request message may include an AP MLD TID-to-Link Mapping Request TLV that triggers a Multi-link Selection procedure for one or both of the fronthaul AP MLD or the backhaul STA MLD of the first Multi-AP Agent 710. In some aspects, the AP MLD TID-to-Link Mapping Request TLV may indicate the MAC address of the fronthaul AP MLD of the Multi-AP Controller 705, the MAC address of the backhaul STA MLD of the first Multi-AP Agent 710, the number of Links, the Link ID, and a TID Bitmap, among other examples. At 833, the first Multi-AP Agent 710 receives the Multi-AP Policy Configuration Request message, decodes the AP MLD TID-to-Link Mapping Request TLV, and obtains the TID-to-Link Mappings for one or both of the fronthaul AP MLD or the backhaul STA MLD of the first Multi-AP Agent 710. At 834, the first Multi-AP Agent 710 reconfigures the TID-to-Link Mappings for one or both of the fronthaul AP MLD or the backhaul STA MLD of the first Multi-AP Agent 710 responsive to the AP MLD TID-to-Link Mapping Request TLV.

Figure 9:
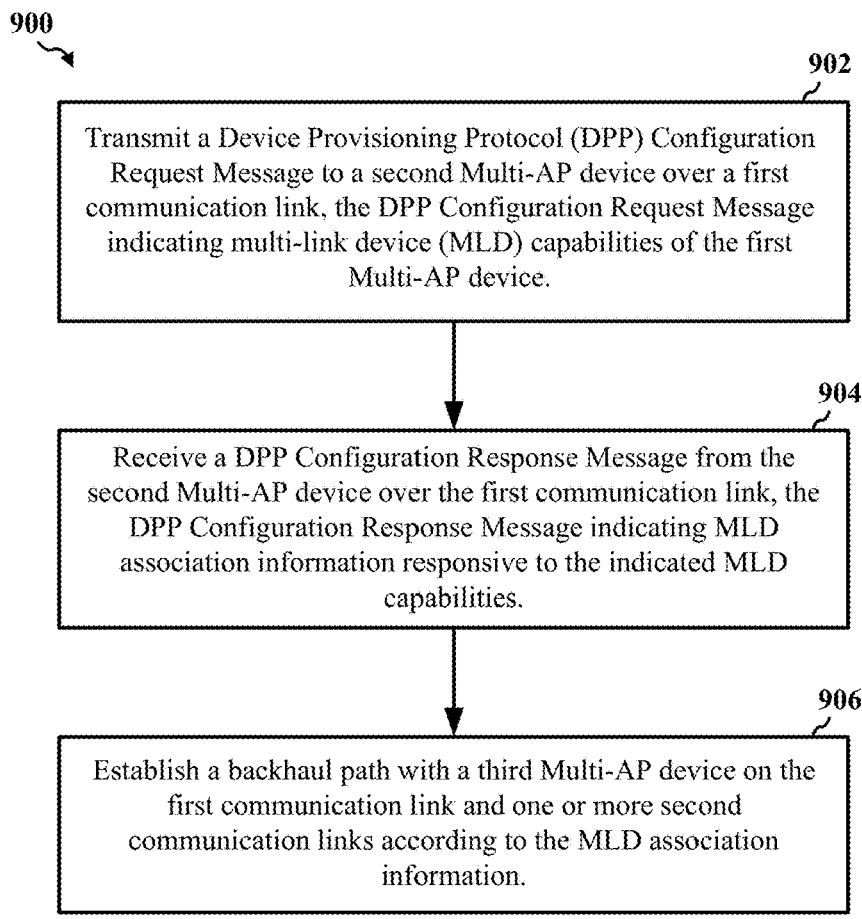
FIGS. 9-15 show flowcharts illustrating example operations for wireless communications that support MLO in a Multi-AP network.

FIG. 9 shows a flowchart illustrating an example operation 900 for wireless communications that support multi-link operation in a Multi-AP network. The operation 900 may be performed by a wireless device operating as a Multi-AP Agent. In some instances, the Multi-AP Agent may be an example of the wireless communication device 200 of FIG. 2, the Multi-AP Agent 304 of FIG. 3B, the Multi-AP Agents 620, 630, or 640 of FIG. 6, or the Multi-AP Agents 710 and 720 of FIG. 7. In various implementations, the Multi-AP Agent may include a fronthaul AP MLD and a backhaul STA MLD. The fronthaul AP MLD may include a plurality of APs that operate on a plurality of communication links of a Multi-AP Network, and the backhaul STA MLD may include a plurality of STAs that operate on the respective plurality of communication links of the Multi-AP Network. In some instances, the fronthaul AP MLD may communicate with a backhaul STA MLD of a downstream Multi-AP device over the plurality of communication links associated with the Multi-AP Network, and the backhaul STA MLD may communicate with a fronthaul AP MLD of an upstream Multi-AP device over the plurality of communication links associated with the Multi-AP Network.

For example, at 902, the Multi-AP device transmits a Device Provisioning Protocol (DPP) Configuration Request Message to a second Multi-AP device over a first communication link, the DPP Configuration Request Message indicating multi-link operation (MLO) capabilities of the first Multi-AP device. At 904, the Multi-AP device receives a DPP Configuration Response Message from the second Multi-AP device over the first communication link, the DPP Configuration Response Message indicating MLO association information responsive to the indicated MLO capabilities. At 906, the Multi-AP device establishes a backhaul path with a third Multi-AP device on the first communication link and one or more second communication links according to the MLO association information.

In some implementations, the MLO capabilities of the first Multi-AP device may be indicated in a DPP Configuration Object of the DPP Configuration Request Message, and the MLO association information may be indicated in an MLD address field of a DPP Configuration Object of the DPP Configuration Response Message. In some instances, the first Multi-AP device may be a first Multi-AP Agent including a backhaul STA MLD configured to communicate with the third Multi-AP device over one or more of the first or second communication links, and the second Multi-AP device may be a Multi-AP Controller configured to onboard the first and third Multi-AP devices according to a Multi-AP communication protocol. In some aspects, the third Multi-AP device may be a second Multi-AP Agent including a fronthaul AP MLD configured to communicate with the backhaul STA MLD of the first Multi-AP Agent over the one or more of the first or second communication links.

Figure 10:
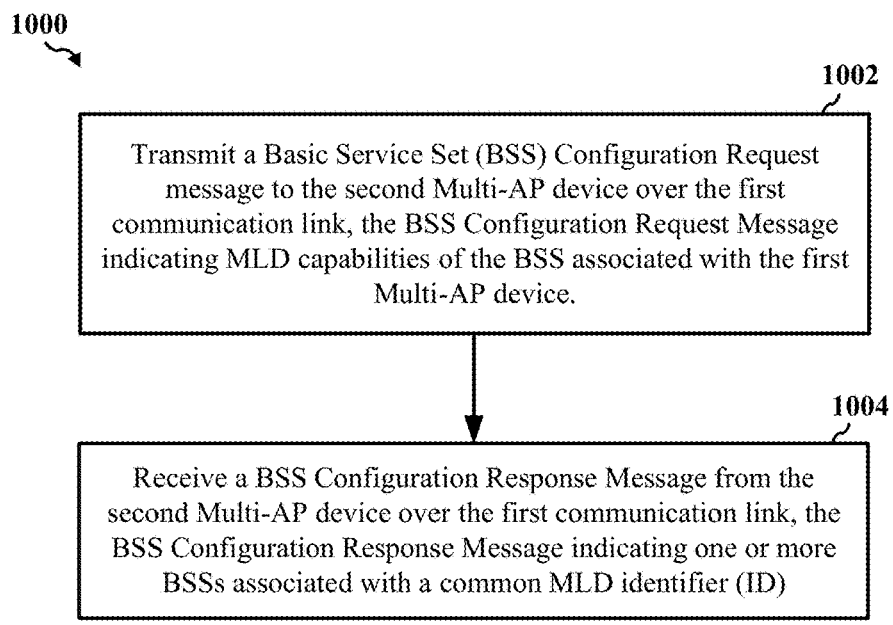

FIG. 10 shows a flowchart illustrating an example operation 1000 for wireless communication that supports multi-link operation in a Multi-AP network. The operation 1000 may be performed by a wireless device operating as a Multi-AP Agent. In some instances, the Multi-AP Agent may be an example of the wireless communication device 200 of FIG. 2, the Multi-AP Agent 304 of FIG. 3B, the Multi-AP Agents 620, 630, or 640 of FIG. 6, or the Multi-AP Agents 710 and 720 of FIG. 7. In various implementations, the Multi-AP Agent may include a fronthaul AP MLD and a backhaul STA MLD. The fronthaul AP MLD may include a plurality of APs that operate on a plurality of communication links of a Multi-AP Network, and the backhaul STA MLD may include a plurality of STAs that operate on the respective plurality of communication links of the Multi-AP Network. In some implementations, the operation 1000 may be performed by the Multi-AP Agent described with reference to FIG. 9.

For example, at 1002, the Multi-AP device transmits a Basic Service Set (BSS) Configuration Request message to the second Multi-AP device over the first communication link, the BSS Configuration Request Message indicating MLO capabilities of the BSS associated with the first Multi-AP device. At 1004, the Multi-AP device receives a BSS Configuration Response Message from the second Multi-AP device over the first communication link, the BSS Configuration Response Message indicating one or more BSSs associated with a common MLD ID. In some implementations, the MLO capabilities of the BSS associated with the first Multi-AP device may be indicated in a DPP Configuration Object of the BSS Configuration Request Message, and the one or more BSSs associated with the common MLD ID may be indicated in an MLD address field of a DPP Configuration Object of the BSS Configuration Response Message.

Figure 11:
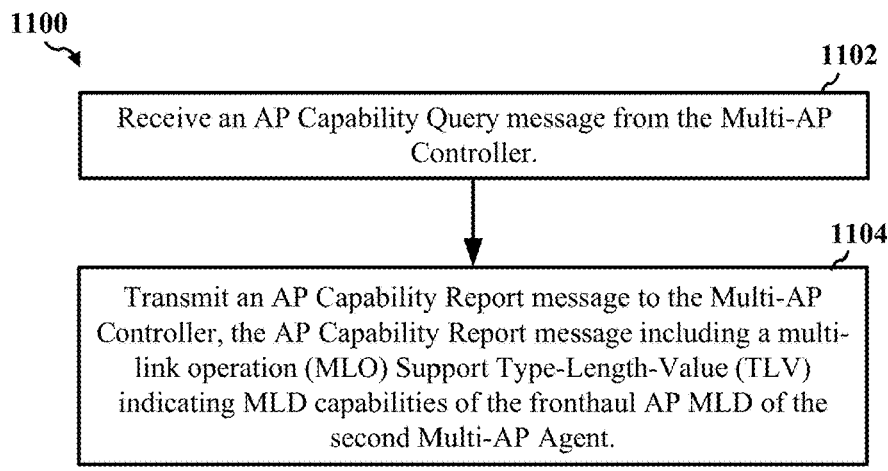

FIG. 11 shows a flowchart illustrating an example operation 1100 for wireless communication that supports multi-link operation in a Multi-AP network. The operation 1100 may be performed by a wireless device operating as a Multi-AP Agent. In some instances, the Multi-AP Agent may be an example of the wireless communication device 200 of FIG. 2, the Multi-AP Agent 304 of FIG. 3B, the Multi-AP Agents 620, 630, or 640 of FIG. 6, or the Multi-AP Agents 710 and 720 of FIG. 7. In various implementations, the Multi-AP Agent may include a fronthaul AP MLD and a backhaul STA MLD. The fronthaul AP MLD may include a plurality of APs that operate on a plurality of communication links of a Multi-AP Network, and the backhaul STA MLD may include a plurality of STAs that operate on the respective plurality of communication links of the Multi-AP Network. In some implementations, the operation 1000 may be performed by the Multi-AP Agent described with reference to FIG. 9.

For example, at 1102, the Multi-AP device receives an AP Capability Query message from the Multi-AP Controller. At 1104, the Multi-AP device transmits an AP Capability Report message to the Multi-AP Controller, the AP Capability Report message including a multi-link operation (MLO) Support Type-Length-Value (TLV) indicating MLO capabilities of the fronthaul AP MLD of the second Multi-AP Agent.

Figure 12:
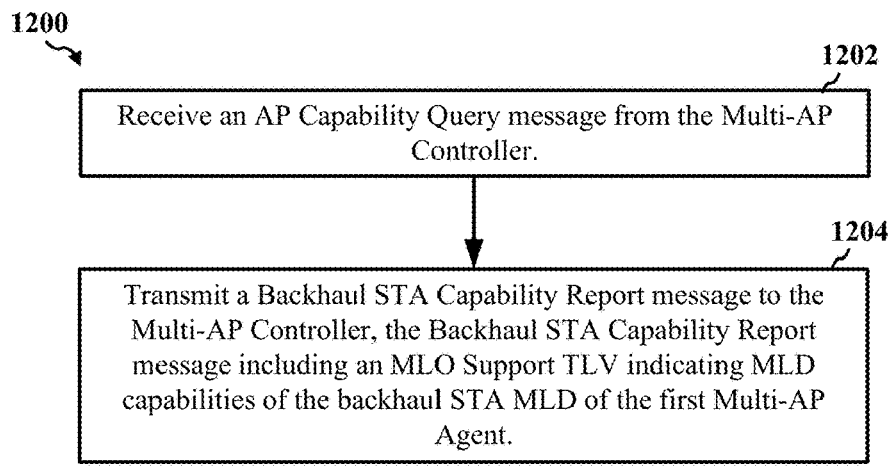

FIG. 12 shows a flowchart illustrating an example operation 1200 for wireless communication that supports multi-link operation in a Multi-AP network. The operation 1200 may be performed by a wireless device operating as a Multi-AP Agent. In some instances, the Multi-AP Agent may be an example of the wireless communication device 200 of FIG. 2, the Multi-AP Agent 304 of FIG. 3B, the Multi-AP Agents 620, 630, or 640 of FIG. 6, or the Multi-AP Agents 710 and 720 of FIG. 7. In various implementations, the Multi-AP Agent may include a fronthaul AP MLD and a backhaul STA MLD. The fronthaul AP MLD may include a plurality of APs that operate on a plurality of communication links of a Multi-AP Network, and the backhaul STA MLD may include a plurality of STAs that operate on the respective plurality of communication links of the Multi-AP Network. In some implementations, the operation 1000 may be performed by the Multi-AP Agent described with reference to FIG. 9.

For example, at 1202, the Multi-AP device receives an AP Capability Query message from the Multi-AP Controller. At 1204, the Multi-AP device transmits a Backhaul STA Capability Report message to the Multi-AP Controller, the Backhaul STA Capability Report message including an MLO Support TLV indicating MLO capabilities of the backhaul STA MLD of the first Multi-AP Agent.

Figure 13:
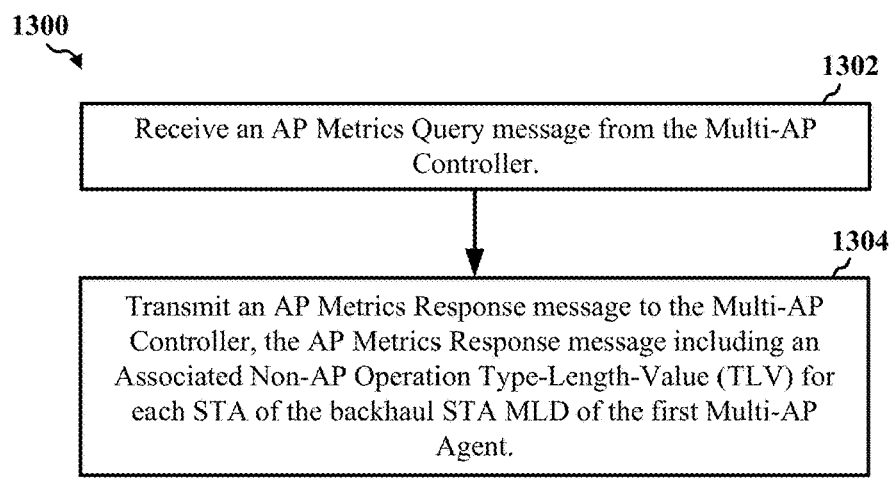

FIG. 13 shows a flowchart illustrating an example operation 1300 for wireless communication that supports multi-link operation in a Multi-AP network. The operation 1300 may be performed by a wireless device operating as a Multi-AP Agent. In some instances, the Multi-AP Agent may be an example of the wireless communication device 200 of FIG. 2, the Multi-AP Agent 304 of FIG. 3B, the Multi-AP Agents 620, 630, or 640 of FIG. 6, or the Multi-AP Agents 710 and 720 of FIG. 7. In various implementations, the Multi-AP Agent may include a fronthaul AP MLD and a backhaul STA MLD. The fronthaul AP MLD may include a plurality of APs that operate on a plurality of communication links of a Multi-AP Network, and the backhaul STA MLD may include a plurality of STAs that operate on the respective plurality of communication links of the Multi-AP Network. In some implementations, the operation 1000 may be performed by the Multi-AP Agent described with reference to FIG. 9.

For example, at 1302, the Multi-AP device receives an AP Metrics Query message from the Multi-AP Controller. At 1304, the Multi-AP device transmits an AP Metrics Response message to the Multi-AP Controller, the AP Metrics Response message including an Associated Non-AP Operation Type-Length-Value (TLV) for each STA of the backhaul STA MLD of the first Multi-AP Agent. In some implementations, the Associated Non-AP Operation TLV for a respective STA of the backhaul STA MLD may indicate an MLO configuration between the respective STA and a respective AP of a fronthaul AP MLD of the first Multi-AP Agent. In some other implementations, the Associated Non-AP Operation TLVs for the backhaul STA MLD may indicate Traffic Identifier (TID)-to-Link Mappings associated with the backhaul STA MLD of the first Multi-AP Agent and a fronthaul AP MLD of the first Multi-AP Agent.

Figure 14:
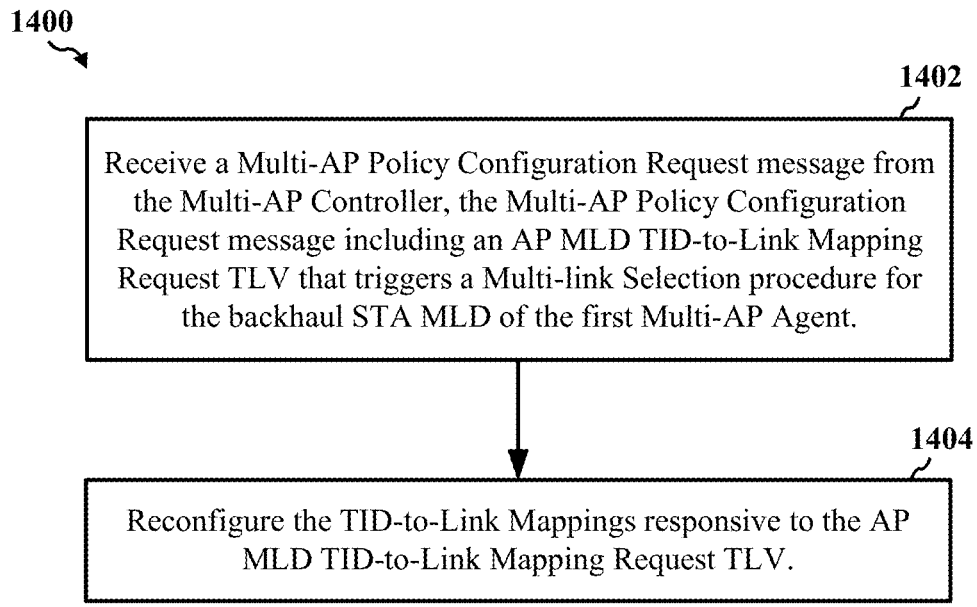

FIG. 14 shows a flowchart illustrating an example operation 1400 for wireless communication that supports multi-link operation in a Multi-AP network. The operation 1400 may be performed by a wireless device operating as a Multi-AP Agent. In some instances, the Multi-AP Agent may be an example of the wireless communication device 200 of FIG. 2, the Multi-AP Agent 304 of FIG. 3B, the Multi-AP Agents 620, 630, or 640 of FIG. 6, or the Multi-AP Agents 710 and 720 of FIG. 7. In various implementations, the Multi-AP Agent may include a fronthaul AP MLD and a backhaul STA MLD. The fronthaul AP MLD may include a plurality of APs that operate on a plurality of communication links of a Multi-AP Network, and the backhaul STA MLD may include a plurality of STAs that operate on the respective plurality of communication links of the Multi-AP Network. In some implementations, the operation 1000 may be performed by the Multi-AP Agent described with reference to FIG. 9.

For example, at 1402, the Multi-AP device receives a Multi-AP Policy Configuration Request message from the Multi-AP Controller, the Multi-AP Policy Configuration Request message including an AP MLD TID-to-Link Mapping Request TLV that triggers a Multi-link Selection procedure for the backhaul STA MLD of the first Multi-AP Agent. At 1404, the Multi-AP device reconfigures the TID-to-Link Mappings responsive to the AP MLD TID-to-Link Mapping Request TLV.

Figure 15:
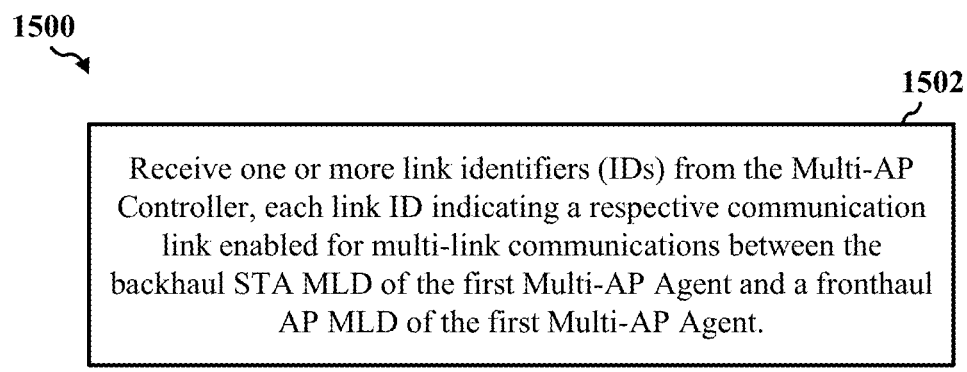

FIG. 15 shows a flowchart illustrating an example operation 1500 for wireless communication that supports multi-link operation in a Multi-AP network. The operation 1500 may be performed by a wireless device operating as a Multi-AP Agent. In some instances, the Multi-AP Agent may be an example of the wireless communication device 200 of FIG. 2, the Multi-AP Agent 304 of FIG. 3B, the Multi-AP Agents 620, 630, or 640 of FIG. 6, or the Multi-AP Agents 710 and 720 of FIG. 7. In various implementations, the Multi-AP Agent may include a fronthaul AP MLD and a backhaul STA MLD. The fronthaul AP MLD may include a plurality of APs that operate on a plurality of communication links of a Multi-AP Network, and the backhaul STA MLD may include a plurality of STAs that operate on the respective plurality of communication links of the Multi-AP Network. In some implementations, the operation 1000 may be performed by the Multi-AP Agent described with reference to FIG. 9.

For example, at 1502, the Multi-AP device receives an Associated STA Link Metrics Query message from the Multi-AP Controller. At 1504, the Multi-AP device transmits an Associated STA Link Metrics Query Response message to the Multi-AP Controller, the Associated STA Link Metrics Query Response message including an Associated Non-AP Operation Type-Length-Value (TLV) for each non-AP MLD client associated with a fronthaul AP MLD of the first Multi-AP Agent.

Figure 16:
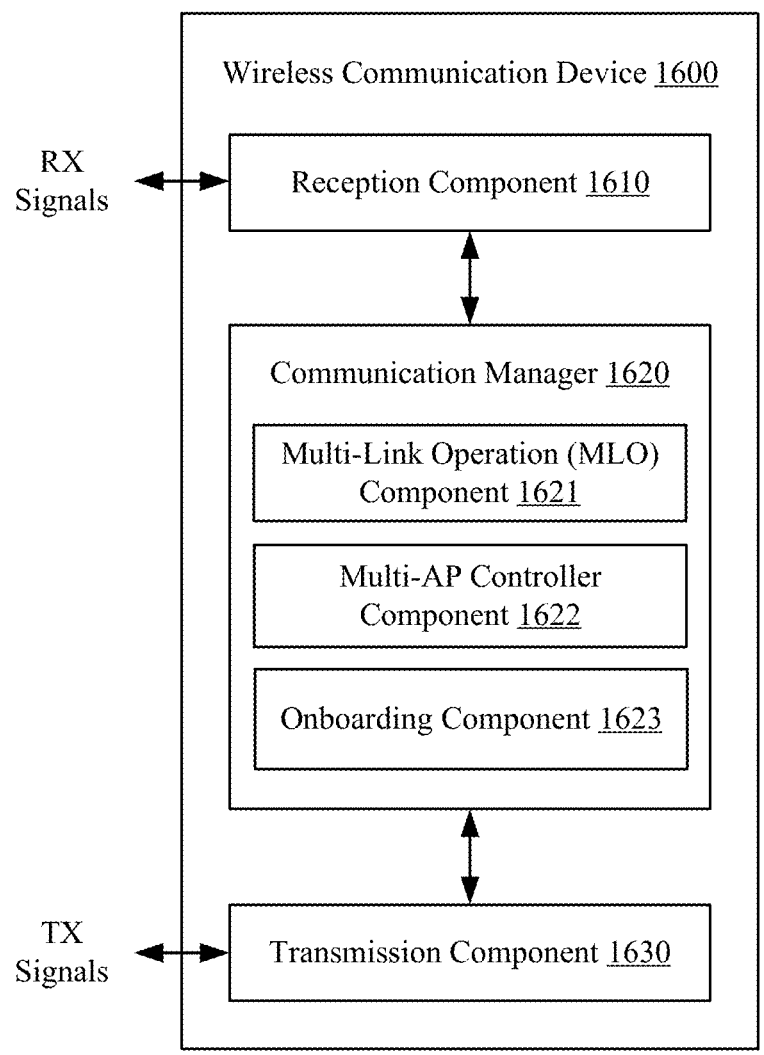
FIG. 16 shows a block diagram of an example wireless communication device.

FIG. 16 shows a block diagram of an example wireless communication device 1600. The wireless communication device 1600 may be configured to perform the operations 900, 1000, 1100, 1200, 1300, 1400, and 1500 described with reference to FIGS. 9, 10, 11, 12, 13, 14, and 15, respectively. In some implementations, the wireless communication device 1600 can be an example implementation of one or more of the Multi-AP device 610 of FIG. 6. In some other implementations, the wireless communication device 1600 can be an example implementation of the Multi-AP Controller 302 of FIG. 3A or the Multi-AP Controller 705 of FIGS. 7 and 8. More specifically, the wireless communication device 1600 can be a chip, SoC, chipset, package or device that includes at least one processor and at least one modem (for example, a Wi-Fi (IEEE 802.11) modem or a cellular modem).

The wireless communication device 1600 includes a reception component 1610, a communication manager 1620, and a transmission component 1630. The communication manager 1620 includes a Multi-link Operation (MLO) component 1621, a Multi-AP Controller component 1622, and an onboarding component 1623. Portions of one or more of the components 1621-1623 may be implemented at least in part in hardware or firmware. In some implementations, one or more of the components 1621-1623 are implemented at least in part as software stored in a memory (such as the memory 208 of FIG. 2). For example, portions of one or more of the components 1621-1623 can be implemented as non-transitory instructions (or "code") executable by a processor (such as the processor 206 of FIG. 2) to perform the functions or operations of the respective component.

The reception component 1610 is configured to receive RX signals from one or more Multi-AP Agents, and the transmission component 1630 is configured to transmit TX signals to the one or more Multi-AP Agents. The communication manager 1620 is configured to manage wireless communications with the one or more Multi-AP Agents. The MLO component 1621 may establish or setup MLO on multiple communication links associated with a Multi-AP Network. In some instances, the MLO component 1621 also may insert one or more of MLO capabilities, MLO association information, or MLO configuration information into Multi-AP messages (such as IEEE 1905.1 management frames or messages) exchanged over the multiple communication links of the Multi-AP Network.

The Multi-AP Controller component 1622 may perform various operations associated with the Multi-AP Network including (but not limited to) discovery of nearby Multi-AP Agents, configuration of the nearby Multi-AP Agents, obtaining measurements from the nearby Multi-AP Agents, and obtaining reports from the nearby Multi-AP Agents.

The onboarding component 1623 may discovered Multi-AP Agents onto the Multi-AP Network. In some implementations, the onboarding component 1623 may onboard the discovered Multi-AP Agents according to the DPP. In some other implementations, the onboarding component 1623 may onboard the discovered Multi-AP Agents according to a Multi-AP onboarding protocol.

Figure 17:
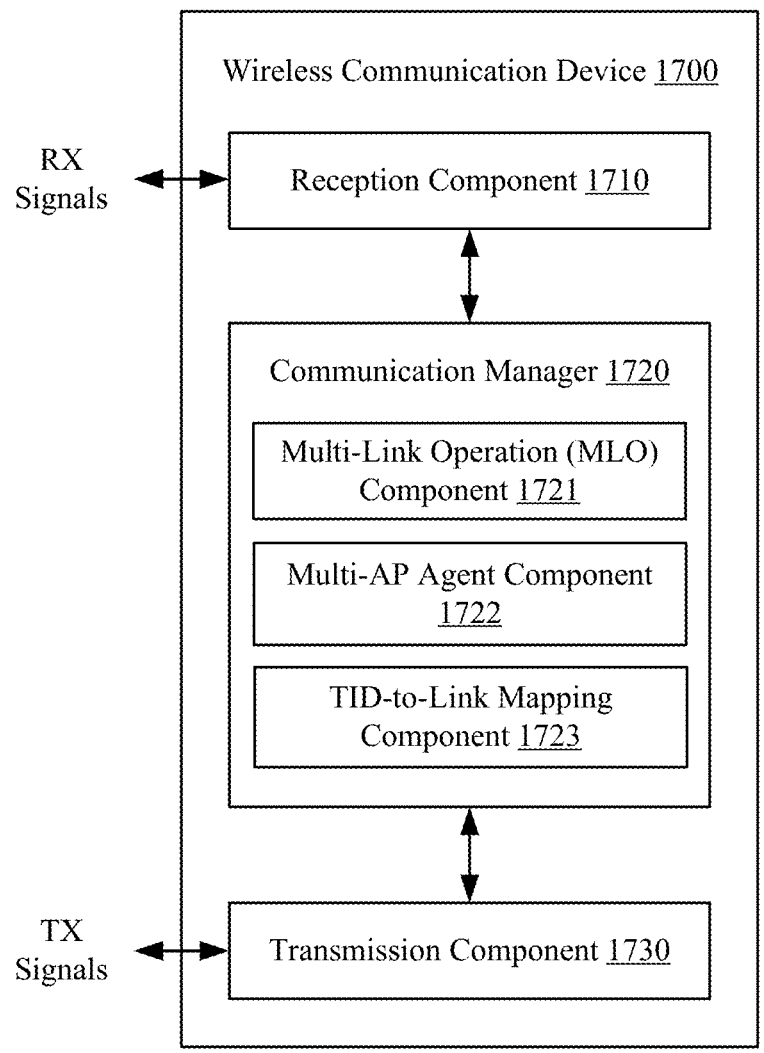
FIG. 17 shows a block diagram of another example wireless communication device.

FIG. 17 shows a block diagram of an example wireless communication device 1700. The wireless communication device 1700 may be configured to perform the operations 900, 1000, 1100, 1200, 1300, 1400, and 1500 described with reference to FIGS. 9, 10, 11, 12, 13, 14, and 15, respectively. In some implementations, the wireless communication device 1700 can be an example implementation of the Multi-AP devices 620, 630, or 640 of FIG. 6. In some other implementations, the wireless communication device 1700 can be an example implementation of the Multi-AP Agent 304 of FIG. 3B, the first Multi-AP Agent 710 of FIGS. 7 and 8, or the second Multi-AP Agent 720 of FIGS. 7 and 8. More specifically, the wireless communication device 1700 can be a chip, SoC, chipset, package or device that includes at least one processor and at least one modem (for example, a Wi-Fi (IEEE 802.11) modem or a cellular modem).

The wireless communication device 1700 includes a reception component 1710, a communication manager 1720, and a transmission component 1730. The communication manager 1720 includes a Multi-link Operation (MLO) component 1721, a Multi-AP Agent component 1722, and a TID-to-Link Mapping component 1723. Portions of one or more of the components 1721-1723 may be implemented at least in part in hardware or firmware. In some implementations, one or more of the components 1721-1723 are implemented at least in part as software stored in a memory (such as the memory 208 of FIG. 2). For example, portions of one or more of the components 1721-1723 can be implemented as non-transitory instructions (or "code") executable by a processor (such as the processor 206 of FIG. 2) to perform the functions or operations of the respective component.

The reception component 1710 is configured to receive RX signals from a Multi-AP Controller or one or more other Multi-AP Agents, and the transmission component 1730 is configured to transmit TX signals to the Multi-AP Controller or the one or more other Multi-AP Agents. The communication manager 1720 is configured to manage wireless communications with the Multi-AP Controller and the one or more other Multi-AP Agents. The MLO component 1721 may establish or setup multi-link operations on the communication links associated with a Multi-AP Network. In some instances, the MLO component 1721 also may insert one or more of MLO capabilities, MLO association information, or MLO configuration information into Multi-AP messages (such as IEEE 1905.1 management frames or messages) exchanged over one or more communication links of the Multi-AP Network.

The Multi-AP Agent component 1722 may perform various operations associated with the Multi-AP Network including (but not limited to) establishing backhaul links capable of MLO with the one or more other Multi-AP Agents, providing measurements responsive to requests from the Multi-AP Controller, and providing reports responsive to requests from the Multi-AP Controller.

The TID-to-Link Mapping component 1723 may determine or obtain mappings between the TIDs of traffic flows associated with a respective Multi-AP Agent and the multiple communication links of the Multi-AP Network provisioned or allocated to the respective Multi-AP Agent. In some instances, the TID-to-Link Mapping component 1723 also may update the mappings based on changes in the communication links provisioned or allocated to the respective Multi-AP Agent.

FIG. 18A shows an example MLD Configuration Report TLV 1800A suitable for use in a BSS Configuration Result message. The MLD Configuration Report TLV 1800A is shown to include fields indicating at least the number of MLDs reported in the BSS Configuration Result message, an MLD MAC address, the number of BSSs under control of the MLD, and a MAC address of the BSS, among other examples.

FIG. 18B shows an example MLO Support TLV 1800B suitable for use in an AP Capability Report message, a Backhaul STA Capability Report message, or a Client Capability Report message. The MLO Support TLV 1800B is shown to include fields indicating at least an MLD MAC address, IEEE 802.11be EML Capabilities, IEEE 802.11be MLD Capabilities, the number of Links associated with the MLD, a Link ID, a MAC address of the Link, an Operating Class, and a Channel Number, among other examples.

FIG. 18C shows an example Associated-Non-AP MLD Operation TLV 1800C suitable for use in an AP Metrics Response message or an Associated STA Link Metrics Response message. The Associated-Non-AP MLD Operation TLV 1800C is shown to include fields indicating at least the AP MLD MAC address, the Associated Non-AP MLD MAC address, the number of Links associated with the AP MLD, a Link ID, a MAC address of the associated Non-AP MLD corresponding to the Link, an Operating Class, a Channel Number, a Presence Bitmap, a TID Bitmap, and a number of TIDs, among other examples.

FIG. 18D shows an example Backhaul Multi-link Steering Request TLV 1800D suitable for use in a Backhaul Steering Request message. The Backhaul Multi-link Steering Request TLV 1800D is shown to include fields indicating at least a MAC address of the associated backhaul non-AP MLD operated by the Multi-AP Agent, a MAC address of the AP MLD for association, a MAC address of the AP affiliated with AP MLD for association, the number of Links, a Link ID, a MAC address of the AP corresponding to the Link, an Operating Class, a Channel Number, a Presence Bitmap, a TID Bitmap, and a number of TIDs, among other examples.

FIG. 18E shows an example AP MLD TID-To-Link Mapping Request TLV 1800E suitable for use in a Multi-AP Policy Configuration Request message. The AP MLD TID-To-Link Mapping Request TLV 1800E is shown to include fields indicating at least an AP MLD MAC address, a Non-AP MLD MAC address, the number of Links, a Link ID, and a TID Bitmap, among other examples.

Implementation examples are described in the following example aspects:

1. A first Multiple Access Point (Multi-AP) device, including:
   one or more interfaces configured to:
     output a Device Provisioning Protocol (DPP) Configuration Request Message to a second Multi-AP device over a first communication link, the DPP Configuration Request Message indicating multi-link operation (MLO) capabilities of the first Multi-AP device; and
     obtain a DPP Configuration Response Message from the second Multi-AP device over the first communication link, the DPP Configuration Response Message indicating MLO association information responsive to the indicated MLO capabilities; and
   a processing system coupled to the one or more interfaces, the processing system configured to:
     establish a backhaul path with a third Multi-AP device on the first communication link and one or more second communication links according to the MLO association information.

2. The first Multi-AP device of aspect 1, where:
   the MLO capabilities of the first Multi-AP device are indicated in a DPP Configuration Object of the DPP Configuration Request Message; and
   the MLO association information is indicated in a multi-link device (MLD) address field of a DPP Configuration Object of the DPP Configuration Response Message.

3. The first Multi-AP device of any one or more of aspects 1-2, where the one or more interfaces are further configured to:
   output a Basic Service Set (BSS) Configuration Request message to the second Multi-AP device over the first communication link, the BSS Configuration Request Message indicating MLO capabilities of the BSS associated with the first Multi-AP device; and
   obtain a BSS Configuration Response Message from the second Multi-AP device over the first communication link, the BSS Configuration Response Message indicating one or more BSSs associated with a common multi-link device (MLD) identifier (ID).

4. The first Multi-AP device of aspect 3, where:
   the MLO capabilities of the BSS associated with the first Multi-AP device are indicated in a DPP Configuration Object of the BSS Configuration Request Message; and
   the one or more BSSs associated with the common MLD ID are indicated in an MLD address field of a DPP Configuration Object of the BSS Configuration Response Message.

5. The first Multi-AP device of any one or more of aspects 1-4, where:
   the first Multi-AP device is a first Multi-AP Agent including a backhaul station (STA) MLD configured to communicate with the third Multi-AP device over one or more of the first or second communication links;
   the second Multi-AP device is a Multi-AP Controller configured to onboard the first and third Multi-AP devices according to a Multi-AP communication protocol; and
   the third Multi-AP device is a second Multi-AP Agent including a fronthaul AP MLD configured to communicate with the backhaul STA MLD of the first Multi-AP Agent over the one or more of the first or second communication links.

6. The first Multi-AP device of aspect 5, where the one or more interfaces are further configured to:
   obtain an AP Capability Query message from the Multi-AP Controller; and
   output an AP Capability Report message to the Multi-AP Controller, the AP Capability Report message including an MLO Support Type-Length-Value (TLV) indicating MLO capabilities of the fronthaul AP MLD of the second Multi-AP Agent.

7. The first Multi-AP device of any one or more of aspects 5-6, where the one or more interfaces are further configured to:
   obtain an AP Capability Query message from the Multi-AP Controller; and
   output a Backhaul STA Capability Report message to the Multi-AP Controller, the Backhaul STA Capability Report message including an MLO Support TLV indicating MLO capabilities of the backhaul STA MLD of the first Multi-AP Agent.

8. The first Multi-AP device of any one or more of aspects 5-6, where the one or more interfaces are further configured to:
   obtain an AP Metrics Query message from the Multi-AP Controller; and
   output an AP Metrics Response message to the Multi-AP Controller, the AP Metrics Response message including an Associated Non-AP Operation Type-Length-Value (TLV) for each STA of the backhaul STA MLD of the first Multi-AP Agent.

9. The first Multi-AP device of aspect 8, where the Associated Non-AP Operation TLV for a respective STA of the backhaul STA MLD indicates an MLO configuration between the respective STA and a respective AP of a fronthaul AP MLD of the first Multi-AP Agent.

10. The first Multi-AP device of aspect 8, where the Associated Non-AP Operation TLVs for the backhaul STA MLD indicate Traffic Identifier (TID)-to-Link Mappings associated with the backhaul STA MLD of the first Multi-AP Agent and a fronthaul AP MLD of the first Multi-AP Agent.

11. The first Multi-AP device of aspect 10, where the one or more interfaces are further configured to:
obtain a Multi-AP Policy Configuration Request message from the Multi-AP Controller, the Multi-AP Policy Configuration Request message including an AP MLD TID-to-Link Mapping Request TLV that triggers a Multi-link Selection procedure for the backhaul STA MLD of the first Multi-AP Agent.

12. The first Multi-AP device of aspect 11, where the processing system is further configured to:
reconfigure the TID-to-Link Mappings responsive to the AP MLD TID-to-Link Mapping Request TLV.

13. The first Multi-AP device of any one or more of aspects 5-12, where the one or more interfaces are further configured to:
obtain an Associated STA Link Metrics Query message from the Multi-AP Controller; and
output an Associated STA Link Metrics Query Response message to the Multi-AP Controller, the Associated STA Link Metrics Query Response message including an Associated Non-AP Operation Type-Length-Value (TLV) for each non-AP MLD client associated with a fronthaul AP MLD of the first Multi-AP Agent.

14. The first Multi-AP device of aspect 13, where the Associated Non-AP Operation TLV for a respective non-AP MLD client indicates an MLO configuration between the respective non-AP MLD client and the fronthaul AP MLD of the first Multi-AP Agent.

15. The first Multi-AP device of any one or more of aspects 12-14, where the Associated Non-AP Operation TLV for a respective non-AP MLD client indicates a Traffic Identifier (TID)-to-Link Mapping associated with the respective non-AP MLD client and the fronthaul AP MLD of the first Multi-AP Agent.

16. The first Multi-AP device of aspect 15, where the one or more interfaces are further configured to:
obtain a Multi-AP Policy Configuration Request message from the Multi-AP Controller, the Multi-AP Policy Configuration Request message including an AP MLD TID-to-Link Mapping Request TLV that triggers a Multi-link Selection procedure for the fronthaul AP MLD of the first Multi-AP Agent.

17. The first Multi-AP device of any one or more of aspects 15-16, where the processing system is further configured to:
reconfigure the TID-to-Link Mapping responsive to the AP MLD TID-to-Link Mapping Request TLV.

18. The first Multi-AP device of any one or more of aspects 5-17, where the one or more interfaces are further configured to:
obtain one or more link identifiers (IDs) from the Multi-AP Controller, each link ID indicating a respective communication link enabled for multi-link communications between the backhaul STA MLD of the first Multi-AP Agent and a fronthaul AP MLD of the first Multi-AP Agent.

19. A method for wireless communication by a first Multi-AP device, including:
transmitting a Device Provisioning Protocol (DPP) Configuration Request Message to a second Multi-AP device over a first communication link, the DPP Configuration Request Message indicating multi-link operation (MLO) capabilities of the first Multi-AP device;
receiving a DPP Configuration Response Message from the second Multi-AP device over the first communication link, the DPP Configuration Response Message indicating MLO association information responsive to the indicated MLO capabilities; and
establishing a backhaul path with a third Multi-AP device on the first communication link and one or more second communication links according to the MLO association information.

20. The method of aspect 19, where:
the MLO capabilities of the first Multi-AP device are indicated in a DPP Configuration Object of the DPP Configuration Request Message; and
the MLO association information is indicated in a multi-link device (MLD) address field of a DPP Configuration Object of the DPP Configuration Response Message.

21. The method of any one or more of aspects 19-20, further including:
transmitting a Basic Service Set (BSS) Configuration Request message to the second Multi-AP device over the first communication link, the BSS Configuration Request Message indicating MLO capabilities of the BSS associated with the first Multi-AP device; and
receiving a BSS Configuration Response Message from the second Multi-AP device over the first communication link, the BSS Configuration Response Message indicating one or more BSSs associated with a common multi-link device (MLD) identifier (ID).

22. The method of aspect 21, where:
the MLO capabilities of the BSS associated with the first Multi-AP device are indicated in a DPP Configuration Object of the BSS Configuration Request Message; and
the one or more BSSs associated with the common MLD ID are indicated in an MLD address field of a DPP Configuration Object of the BSS Configuration Response Message.

23. The method of any one or more of aspects 19-22, where:
the first Multi-AP device is a first Multi-AP Agent including a backhaul station (STA) MLD configured to communicate with the third Multi-AP device over one or more of the first or second communication links;
the second Multi-AP device is a Multi-AP Controller configured to onboard the first and third Multi-AP devices according to a Multi-AP communication protocol; and
the third Multi-AP device is a second Multi-AP Agent including a fronthaul AP MLD configured to communicate with the backhaul STA MLD of the first Multi-AP Agent over the one or more of the first or second communication links.

24. The method of aspect 23, further including:
receiving an AP Metrics Query message from the Multi-AP Controller; and
transmitting an AP Metrics Response message to the Multi-AP Controller, the AP Metrics Response message including an Associated Non-AP Operation Type-Length-Value (TLV) for each STA of the backhaul STA MLD of the first Multi-AP Agent.

25. The method of aspect 24, where the Associated Non-AP Operation TLV for a respective STA of the backhaul STA MLD indicates an MLO configuration between the respective STA and a respective AP of a fronthaul AP MLD associated with the first Multi-AP Agent.

26. The method of aspect 25, where the Associated Non-AP Operation TLVs for the backhaul STA MLD indicate a Traffic Identifier (TID)-to-Link Mapping associated with the backhaul STA MLD of the first Multi-AP Agent and a fronthaul AP MLD of the first Multi-AP Agent.

27. The method of aspect 26, further including:
receiving a Multi-AP Policy Configuration Request message from the Multi-AP Controller, the Multi-AP Policy Configuration Request message including an AP MLD TID-to-Link Mapping Request TLV that triggers a Multi-link Selection procedure for the backhaul STA MLD of the first Multi-AP Agent.

28. The method of aspect 27, further including:
reconfiguring the TID-to-Link Mapping responsive to the AP MLD TID-to-Link Mapping Request TLV.

29. The method of any one or more of aspects 23-28, further including:
receiving an Associated STA Link Metrics Query message from the Multi-AP Controller; and
transmitting an Associated STA Link Metrics Query Response message to the Multi-AP Controller, the Associated STA Link Metrics Query Response message including an Associated Non-AP Operation Type-Length-Value (TLV) for each non-AP MLD client associated with a fronthaul AP MLD of the first Multi-AP Agent.

30. The method of aspect 29, where the Associated Non-AP Operation TLV for a respective non-AP MLD client indicates an MLO configuration between the respective non-AP MLD client and the fronthaul AP MLD of the first Multi-AP Agent.

31. An apparatus for wireless communications, including means for performing a method according to any one or more of aspects 19-30.

32. A non-transitory computer-readable storage medium storing instructions that, when executed by a processing system of an apparatus, cause the apparatus to perform operations according to any one or more of aspects 19-30.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c. As used herein, "based on" is intended to be interpreted in the inclusive sense, unless otherwise explicitly indicated. For example, "based on" may be used interchangeably with "based at least in part on," unless otherwise explicitly indicated. Specifically, unless a phrase refers to "based on only 'a,'" or the equivalent in context, whatever it is that is "based on 'a,'" or "based at least in part on 'a,'" may be based on "a" alone or based on a combination of "a" and one or more other factors, conditions or information.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described herein. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described herein as acting in particular combinations, and even initially claimed as such, one or more features from a claimed combination can In some instances be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example operations in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described herein should not be understood as requiring such separation in all implementations, and it should be understood that the described program components and systems can generally be integrated together in a single software product or packaged into multiple software products.

What is claimed is:

1. A first Multiple Access Point (Multi-AP) device, comprising:
a processing system that includes one or more processors and one or more memories coupled with the one or more processors, the processing system configured to cause the first Multi-AP device to:
output a Device Provisioning Protocol (DPP) Configuration Request Message to a second Multi-AP device over a first communication link, the DPP Configuration Request Message indicating multi-link operation (MLO) capabilities of the first Multi-AP device;
obtain a DPP Configuration Response Message from the second Multi-AP device over the first communication link, the DPP Configuration Response Message indicating MLO association information responsive to the indicated MLO capabilities; and
establish a backhaul path with a third Multi-AP device on the first communication link and one or more second communication links according to the MLO association information.

2. The first Multi-AP device of claim 1, wherein:
the MLO capabilities of the first Multi-AP device are indicated in a DPP Configuration Object of the DPP Configuration Request Message; and
the MLO association information is indicated in a multi-link device (MLD) address field of a DPP Configuration Object of the DPP Configuration Response Message.

3. The first Multi-AP device of claim 1, wherein the processing system is further configured to cause the first Multi-AP device to:
output a Basic Service Set (BSS) Configuration Request Message to the second Multi-AP device over the first communication link, the BSS Configuration Request Message indicating MLO capabilities of the BSS associated with the first Multi-AP device; and
obtain a BSS Configuration Response Message from the second Multi-AP device over the first communication link, the BSS Configuration Response Message indicating one or more BSSs associated with a common multi-link device (MLD) identifier (ID).

4. The first Multi-AP device of claim 3, wherein:
the MLO capabilities of the BSS associated with the first Multi-AP device are indicated in a DPP Configuration Object of the BSS Configuration Request Message; and
the one or more BSSs associated with the common MLD ID are indicated in an MLD address field of a DPP Configuration Object of the BSS Configuration Response Message.

5. The first Multi-AP device of claim 1, wherein:
the first Multi-AP device is a first Multi-AP Agent including a backhaul station (STA) MLD configured to communicate with the third Multi-AP device over one or more of the first or second communication links;
the second Multi-AP device is a Multi-AP Controller configured to onboard the first and third Multi-AP devices according to a Multi-AP communication protocol; and
the third Multi-AP device is a second Multi-AP Agent including a fronthaul AP MLD configured to communicate with the backhaul STA MLD of the first Multi-AP Agent over the one or more of the first or second communication links.

6. The first Multi-AP device of claim 5, wherein the processing system is further configured to cause the first Multi-AP device to:
obtain an AP Capability Query message from the Multi-AP Controller; and
output an AP Capability Report message to the Multi-AP Controller, the AP Capability Report message including an MLO Support Type-Length-Value (TLV) indicating MLO capabilities of the fronthaul AP MLD of the second Multi-AP Agent.

7. The first Multi-AP device of claim 5, wherein the processing system is further configured to cause the first Multi-AP device to:
obtain an AP Capability Query message from the Multi-AP Controller; and
output a Backhaul STA Capability Report message to the Multi-AP Controller, the Backhaul STA Capability Report message including an MLO Support TLV indicating MLO capabilities of the backhaul STA MLD of the first Multi-AP Agent.

8. The first Multi-AP device of claim 5, wherein the processing system is further configured to cause the first Multi-AP device to:
obtain an AP Metrics Query message from the Multi-AP Controller; and
output an AP Metrics Response message to the Multi-AP Controller, the AP Metrics Response message including an Associated Non-AP Operation Type-Length-Value (TLV) for each STA of the backhaul STA MLD of the first Multi-AP Agent.

9. The first Multi-AP device of claim 8, wherein the Associated Non-AP Operation TLV for a respective STA of the backhaul STA MLD indicates an MLO configuration between the respective STA and a respective AP of a fronthaul AP MLD of the first Multi-AP Agent.

10. The first Multi-AP device of claim 8, wherein the Associated Non-AP Operation TLVs for the backhaul STA MLD indicate Traffic Identifier (TID)-to-Link Mappings associated with the backhaul STA MLD of the first Multi-AP Agent and a fronthaul AP MLD of the first Multi-AP Agent.

11. The first Multi-AP device of claim 10, wherein the processing system is further configured to cause the first Multi-AP device to:
obtain a Multi-AP Policy Configuration Request message from the Multi-AP Controller, the Multi-AP Policy Configuration Request message including an AP MLD TID-to-Link Mapping Request TLV that triggers a Multi-link Selection procedure for the backhaul STA MLD of the first Multi-AP Agent.

12. The first Multi-AP device of claim 11, wherein the processing system is further configured to cause the first Multi-AP device to:
reconfigure the TID-to-Link Mappings responsive to the AP MLD TID-to-Link Mapping Request TLV.

13. The first Multi-AP device of claim 5, wherein the processing system is further configured to cause the first Multi-AP device to:
obtain an Associated STA Link Metrics Query message from the Multi-AP Controller; and
output an Associated STA Link Metrics Query Response message to the Multi-AP Controller, the Associated STA Link Metrics Query Response message including an Associated Non-AP Operation Type-Length-Value (TLV) for each non-AP MLD client associated with a fronthaul AP MLD of the first Multi-AP Agent.

14. The first Multi-AP device of claim 13, wherein the Associated Non-AP Operation TLV for a respective non-AP MLD client indicates an MLO configuration between the respective non-AP MLD client and the fronthaul AP MLD of the first Multi-AP Agent.

15. The first Multi-AP device of claim 13, wherein the Associated Non-AP Operation TLV for a respective non-AP MLD client indicates a Traffic Identifier (TID)-to-Link Mapping associated with the respective non-AP MLD client and the fronthaul AP MLD of the first Multi-AP Agent.

16. The first Multi-AP device of claim 15, wherein the processing system is further configured to cause the first Multi-AP device to:
obtain a Multi-AP Policy Configuration Request message from the Multi-AP Controller, the Multi-AP Policy Configuration Request message including an AP MLD TID-to-Link Mapping Request TLV that triggers a Multi-link Selection procedure for the fronthaul AP MLD of the first Multi-AP Agent.

17. The first Multi-AP device of claim 16, wherein the processing system is further configured to cause the first Multi-AP device to:
reconfigure the TID-to-Link Mapping responsive to the AP MLD TID-to-Link Mapping Request TLV.

18. The first Multi-AP device of claim 5, wherein the processing system is further configured to cause the first Multi-AP device to:
obtain one or more link identifiers (IDs) from the Multi-AP Controller, each link ID indicating a respective communication link enabled for multi-link communications between the backhaul STA MLD of the first Multi-AP Agent and a fronthaul AP MLD of the first Multi-AP Agent.

19. A method for wireless communication by a first Multi-AP device, comprising:
transmitting a Device Provisioning Protocol (DPP) Configuration Request Message to a second Multi-AP device over a first communication link, the DPP Configuration Request Message indicating multi-link operation (MLO) capabilities of the first Multi-AP device;
receiving a DPP Configuration Response Message from the second Multi-AP device over the first communication link, the DPP Configuration Response Message indicating MLO association information responsive to the indicated MLO capabilities; and
establishing a backhaul path with a third Multi-AP device on the first communication link and one or more second communication links according to the MLO association information.

20. The method of claim 19, wherein:
the MLO capabilities of the first Multi-AP device are indicated in a DPP Configuration Object of the DPP Configuration Request Message; and
the MLO association information is indicated in a multi-link device (MLD) address field of a DPP Configuration Object of the DPP Configuration Response Message.

21. The method of claim 19, further comprising:
transmitting a Basic Service Set (BSS) Configuration Request Message to the second Multi-AP device over the first communication link, the BSS Configuration Request Message indicating MLO capabilities of the BSS associated with the first Multi-AP device; and
receiving a BSS Configuration Response Message from the second Multi-AP device over the first communication link, the BSS Configuration Response Message indicating one or more BSSs associated with a common multi-link device (MLD) identifier (ID).

22. The method of claim 21, wherein:
the MLO capabilities of the BSS associated with the first Multi-AP device are indicated in a DPP Configuration Object of the BSS Configuration Request Message; and
the one or more BSSs associated with the common MLD ID are indicated in an MLD address field of a DPP Configuration Object of the BSS Configuration Response Message.

23. The method of claim 19, wherein:
the first Multi-AP device is a first Multi-AP Agent including a backhaul station (STA) MLD configured to communicate with the third Multi-AP device over one or more of the first or second communication links;
the second Multi-AP device is a Multi-AP Controller configured to onboard the first and third Multi-AP devices according to a Multi-AP communication protocol; and
the third Multi-AP device is a second Multi-AP Agent including a fronthaul AP MLD configured to communicate with the backhaul STA MLD of the first Multi-AP Agent over the one or more of the first or second communication links.

24. The method of claim 23, further comprising:
receiving an AP Metrics Query message from the Multi-AP Controller; and
transmitting an AP Metrics Response message to the Multi-AP Controller, the AP Metrics Response message including an Associated Non-AP Operation Type-Length-Value (TLV) for each STA of the backhaul STA MLD of the first Multi-AP Agent.

25. The method of claim 24, wherein the Associated Non-AP Operation TLV for a respective STA of the backhaul STA MLD indicates an MLO configuration between the respective STA and a respective AP of a fronthaul AP MLD associated with the first Multi-AP Agent.

26. The method of claim 25, wherein the Associated Non-AP Operation TLVs for the backhaul STA MLD indicate a Traffic Identifier (TID)-to-Link Mapping associated with the backhaul STA MLD of the first Multi-AP Agent and a fronthaul AP MLD of the first Multi-AP Agent.

27. The method of claim 26, further comprising:
receiving a Multi-AP Policy Configuration Request message from the Multi-AP Controller, the Multi-AP Policy Configuration Request message including an AP MLD TID-to-Link Mapping Request TLV that triggers a Multi-link Selection procedure for the backhaul STA MLD of the first Multi-AP Agent.

28. The method of claim 27, further comprising:
reconfiguring the TID-to-Link Mapping responsive to the AP MLD TID-to-Link Mapping Request TLV.

29. The method of claim 23, further comprising:
receiving an Associated STA Link Metrics Query message from the Multi-AP Controller; and
transmitting an Associated STA Link Metrics Query Response message to the Multi-AP Controller, the Associated STA Link Metrics Query Response message including an Associated Non-AP Operation Type-Length-Value (TLV) for each non-AP MLD client associated with a fronthaul AP MLD of the first Multi-AP Agent.

30. The method of claim 29, wherein the Associated Non-AP Operation TLV for a respective non-AP MLD client indicates an MLO configuration between the respective non-AP MLD client and the fronthaul AP MLD of the first Multi-AP Agent.

* * * * *